(12) United States Patent
Ju et al.

(10) Patent No.: US 10,274,144 B2
(45) Date of Patent: Apr. 30, 2019

(54) LAMP, LAMP SYSTEM AND METHOD FOR ASSEMBLING LAMP SYSTEM

(71) Applicants: Radiant Opto-Electronics (Suzhou) Co., Ltd., Wujiang Jiangsu (CN); Radiant Opto-Electronics Corporation, Kaohsiung (TW)

(72) Inventors: Chih-Hung Ju, Kaohsiung (TW); Guo-Hao Huang, Kaohsiung (TW)

(73) Assignees: RADIANT OPTO-ELECTRONICS (SUZHOU) CO., LTD., Wujiang Jiangsu (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 16/175,436

(22) Filed: Oct. 30, 2018

(65) Prior Publication Data

US 2019/0064426 A1    Feb. 28, 2019

Related U.S. Application Data

(63) Continuation-in-part of application No. 15/310,190, filed as application No. PCT/CN2015/099797 on Dec. 30, 2015, now Pat. No. 10,126,486.

(30) Foreign Application Priority Data

Dec. 15, 2015    (CN) .......................... 2015 1 0932758

(51) Int. Cl.
*F21S 2/00*    (2016.01)
(52) U.S. Cl.
CPC .................................... *F21S 2/005* (2013.01)

(58) Field of Classification Search
CPC . F21S 2/005; F21S 8/061; F21S 8/068; G02B 6/0083; G02B 6/009; G02B 6/0091; F21V 23/001; F21V 23/02
See application file for complete search history.

(56) References Cited

U.S. PATENT DOCUMENTS

| 9,664,365 | B2 * | 5/2017 | Myers | ........................ | F21S 8/04 |
| 2012/0257383 | A1 * | 10/2012 | Zhang | ..................... | F21S 2/005 |
| | | | | | 362/235 |
| 2013/0044512 | A1 * | 2/2013 | Araki | ........................ | F21S 8/04 |
| | | | | | 362/607 |

FOREIGN PATENT DOCUMENTS

| CN | 203223775 U | 10/2013 |
| CN | 203240328 U | 10/2013 |
| CN | 105135285 A | 12/2015 |

* cited by examiner

*Primary Examiner* — Mary Ellen Bowman
(74) *Attorney, Agent, or Firm* — McClure, Qualey & Rodack, LLP

(57) ABSTRACT

A lamp is provided. The lamp includes a frame body, a light guide plate and plural light sources. The frame body has an accommodating space. The frame body includes at least one integrating member and plural side covers, and the integrating member includes a conductive assembly. The light guide plate is disposed in the accommodating space. The light sources are respectively disposed in the side covers and disposed adjacent to side edges of the light guide plate. The conductive assembly is disposed on one side of the integrating member near the light guide plate, and the conductive assembly is connected to the light sources to form an electrical loop.

18 Claims, 23 Drawing Sheets

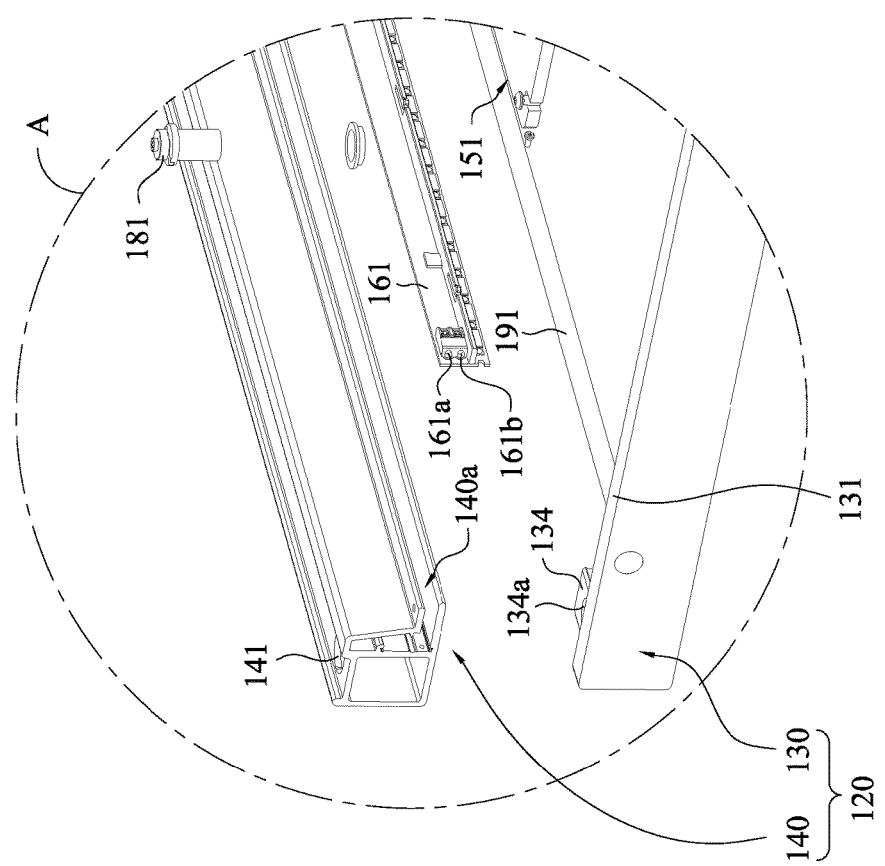

LAMP, LAMP SYSTEM AND METHOD FOR ASSEMBLING LAMP SYSTEM

RELATED APPLICATIONS

This application claims priority to International Application No. PCT/CN2018/110071 filed on Oct. 12, 2018 and is a continuation-in-part application of U.S. application Ser. No. 15/310,190, filed on Nov. 10, 2016, which is the U.S. national phase under § 371 of International Application No. PCT/CN2015/099797, filed on Dec. 30, 2015, which claims priority to China Patent Application Serial Number 201510932758.3, filed on Dec. 15, 2015. The entire disclosures of all the above applications are hereby incorporated by reference herein.

BACKGROUND

Field of Invention

The present invention relates to an illuminating device. More particularly, the present invention relates to a lamp.

Description of Related Art

Lamps become more diversified to meet market requirements. One of conventional lamps is a hanging transparent lamp which can achieve better appearance and illumination.

However, most of hanging transparent lamps uses externally exposed wires to connect to a power supply. Such externally exposed wires not only have complicated assembling processes and high manufacturing cost, but also result in a messy visual effect in a space.

SUMMARY

One object of the present invention is to provide a lamp in which an integrating member with an electrical connection function is used to integrate a power supply, a light source and a light guide plate, thereby completing the assembly of the lamp that has a simple structure and can be rapidly assembly.

According to the aforementioned object, a lamp is provided. The lamp includes a frame body, a light guide plate and plural light sources. The frame body has an accommodating space. The frame body includes at least one integrating member and plural side covers, and the integrating member includes a conductive assembly. The light guide plate is disposed in the accommodating space. The light sources are respectively disposed in the side covers and disposed adjacent to side edges of the light guide plate. The conductive assembly is disposed on one side of the integrating member near the light guide plate, and the conductive assembly is connected to the light sources to form an electrical loop.

According to an embodiment of the present invention, the lamp further includes a power supply, and the power supply includes a first power supply terminal and a second power supply terminal. The integrating member includes a main body and a plurality of electrical connectors. The conductive assembly includes a first conductive plate, a second conductive plate and a third conductive plate. The first conductive plate is disposed on the main body and is electrically connected to the first power supply terminal. The second conductive plate is disposed on the main body. The third conductive plate is disposed on the main body and is electrically connected to the second power supply terminal. The first conductive plate, second conductive plate and the third conductive plate are spaced from each other at distances, and the first conductive plate and the second conductive plate are electrically connected to each other via one portion of the electrical connectors, and the second conductive plate and the third conductive plate are electrically connected to each other via the other portion of the electrical connectors.

According to an embodiment of the present invention, the light guide plate has a first light-incident surface and a second light-incident surface. The light sources include a first light source and a second light source. The first light source is disposed adjacent to the first light-incident surface, in which the first light source is electrically connected between the first conductive plate and the second conductive plate. The second light source is disposed adjacent to the second light-incident surface, in which the second light source is electrically connected between the second conductive plate and the third conductive plate.

According to an embodiment of the present invention, the electrical connectors includes a first conductive post, a second conductive post, a third conductive post and a fourth conductive post, in which the first conductive post is electrically connected to the first conductive plate, and the second conductive post and the third conductive post are electrically connected to the second conductive plate, and the fourth conductive post is electrically connected to the third conductive plate.

According to an embodiment of the present invention, the first light source includes a first input terminal and a first output terminal. The first input terminal is electrically connected to the first conductive post. The first output terminal is electrically connected to the second conductive post. The second light source includes a second input terminal and a second output terminal. The second input terminal is electrically connected to the third conductive post. The second output terminal is electrically connected to the fourth conductive post.

According to an embodiment of the present invention, the integrating member includes a first connecting base and a second connecting base. The first connecting base is disposed on the main body, in which a portion of the first conductive plate is embedded in the first connecting base. The second connecting base is disposed on the main body, in which a portion of the third conductive plate is embedded in the second connecting base.

According to an embodiment of the present invention, the lamp further includes a first charged cable and a second charged cable. One end of the first charged cable is connected to the first power supply terminal of the power supply, and the other end of the first charged cable is fixed on the first connecting base and is connected to the first conductive plate. One end of the second charged cable is connected to the second power supply terminal of the power supply, and the other end of the first charged cable is fixed on the second connecting base and is connected to the third conductive plate.

According to an embodiment of the present invention, the other end of the first charged cable is fixed on the first connecting base via a first conductive base. The other end of the second charged cable is fixed on the second connecting base via a second conductive base.

According to an embodiment of the present invention, the lamp further includes a first tube and a second tube. The first tube is connected to a first through hole of the first connecting base, and the other end of the first charged cable passes through the first through hole and is extended into the first tube. The second tube is connected to a second through hole of the second connecting base, and the other end of the second charged cable passes through the second through hole and is extended into the second tube.

According to an embodiment of the present invention, the main body of the integrating member is an insulation, and one portion of each of the first conductive plate, the second conductive plate and the third conductive plate is embedded in the main body, and the other portion of each of the first conductive plate, the second conductive plate and the third conductive plate is exposed out of the main body.

According to an embodiment of the present invention, the integrating member includes a reinforced plate, and the reinforced plate is embedded in the main body and is not connected to the first conductive plate, the second conductive plate and the third conductive plate.

According to an embodiment of the present invention, the frame body includes an assembly frame, and a first side of the light guide plate is disposed on the integrating member, and a second side opposite to the first side of the light guide plate is disposed on the assembly frame.

According to an embodiment of the present invention, the assembly frame includes a first assembly base and a second assembly base.

According to an embodiment of the present invention, the lamp further includes a first uncharged cable and a second uncharged cable. One end of the first uncharged cable is connected to the first assembly base, and the other end of the first uncharged cable is extended out of the first assembly base. One end of the second uncharged cable is connected to the second assembly base, and the other end of the second uncharged cable is extended out of the second assembly base.

According to an embodiment of the present invention, the other end of the first uncharged cable is fixed on the first assembly base via a first non-conductive base. The other end of the second uncharged cable is fixed on the assembly base via a second non-conductive base.

According to an embodiment of the present invention, the first tube is connected to a first through hole of the first assembly base, and the other end of the first uncharged cable passes through the first through hole and is extended into the first tube. The second tube is connected to a second through hole of the second assembly base, and the other end of the second uncharged cable passes through the second through hole and is extended into the second tube.

According to the aforementioned embodiments of the present invention, the present invention uses the integrating member to integrate and simplify the electrical loop in the lamp. Moreover, the light sources and the power supply can be electrically connected by using the conductive assembly without needing to use electric wires, thereby simplifying the structure of the lamp and reducing assembling time and manufacture cost.

According to the aforementioned embodiments of the present invention, the present invention uses the integrating member to integrate and simplify the electrical loop in the lamp. Moreover, the light sources and the power supply can be electrically connected by using the conductive assembly without needing to use electric wires, thereby simplifying the structure of the lamp and reducing assembling time and manufacture cost.

According to the aforementioned object, a lamp is provided. The lamp includes a frame body, a light guide plate, at least one light source and a circuit assembly. The frame body includes two side covers, two side bars, a first integrating member and a second integrating member. The side covers are disposed opposite to each other, in which each of the side covers includes a carrying portion, a first end and a second end opposite to the first end. The side bars respectively disposed on the side covers, in which each of the two side covers is partitioned into an upper space and a lower space by the side bar. The first integrating member is disposed on the first ends of the side covers and located in the upper spaces of the side covers. The second integrating member is disposed on the second ends of the side covers and located in the upper spaces of the side covers. The light guide plate is held on the carrying portions of the side covers and partially located in the lower spaces of the side covers, in which the light guide plate has at least one side surface, a first light-emitting surface and a second light-emitting surface, and the first light-emitting surface and the second light-emitting surface are respectively connected to two opposite edges of the side surface, and only side edge portions of the first light-emitting surface and the second light-emitting surface are covered by the frame body. The light source is disposed on the carrying portion of the side cover and is disposed adjacent to the side surface of the light guide plate. The circuit assembly is disposed on the frame body and is connected to the light source to form an electrical loop.

According to the aforementioned object, a lamp system is provided. The lamp system includes plural aforementioned lamps and plural supporting bars. Each of supporting bars is the disposed between the side covers of every two adjacent ones of the lamps. The light guide plates of the lamps are continuously connected to each other. The circuit assembly of each of the lamps further includes a driver which is electrically connected to the light source. The first connector of the circuit assembly of an endmost one of the lamps is configured to be connected to an external AC source. The first connector of the circuit assembly of each of the rest of the lamps is connected to the second connector of its adjacent lamp so as to form a connection with the endmost one of the lamps.

According to the aforementioned object, a method for assembling the lamp system is provided. The method includes the following steps. At first, plural aforementioned lamps are provided. Each of the side covers has an accommodating channel. The circuit assembly of each of the lamps includes a first connector, a second connector and a bundle of wires. The first connector is disposed in the first integrating member. The second connector is disposed in the second integrating member. The bundle of wires is electrically connected to the first connector and the second connector. Thereafter, at least two supporting bars are disposed between the accommodating channels of the side covers of two adjacent lamps. Then, the first connector of one of the lamps is jointed to the second connector of another lamp adjacent to the one of the lamps to connect the lamps together.

According to the aforementioned object, a lamp is provided. The lamp includes a frame body, a light guide plate and at least one light source. The frame body has an accommodating channel, in which the frame body includes plural side covers. The light guide plate is disposed in the accommodating channel, in which the light guide plate has at least one side surface, a first light-emitting surface and a second light-emitting surface, and the first light-emitting surface and the second light-emitting surface are respectively connected to two opposite edges of the side surface. The light source is disposed in the at least one of the side covers. Only side edge portions of the first light-emitting surface and the second light-emitting surface are covered by the frame body. The first light-emitting surface and the second light-emitting surface are respectively faced upwardly and downwardly. No component blocks the light emitted from the first light-emitting surface faced upwardly.

According to the aforementioned object, a lamp system is provided. The lamp system includes a frame body, a light guide plate and at least one light source. The frame body having an accommodating space, in which the frame body includes plural side covers and plural end caps, and each of the end caps has a couple mechanism. The light guide plate is disposed in the accommodating space, in which the light guide plate has at least one side surface, a first light-emitting surface and a second light-emitting surface, and the first light-emitting surface and the second light-emitting surface are respectively connected to two opposite edges of the side surface. The light source is disposed in the at least one of the side covers. Only side edge portions of the first light-emitting surface and the second light-emitting surface are covered by the frame body. the first light-emitting surface and the second light-emitting surface are faced upwardly and downwardly. No component blocks the light emitted from the first light-emitting surface faced upwardly. the couple mechanism of one end cap of the frame body is coupled to another couple mechanism of the end cap of the frame body of another lamp.

According to the aforementioned embodiments of the present invention, the present invention uses the frame body to integrate the circuit assembly, the light source and the light guide plate together, thereby forming a lamp with a simple structure and a quick assembly function. In addition, the frame body of the present invention does not cover the main light-emitting surface of the light guide plate. Therefore, when plural lamps are connected in series to form a lamp system, the light guide plates of the lamps can be jointed to form a continuous structure, thereby improving the appearance of the lamp system.

BRIEF DESCRIPTION OF THE DRAWINGS

The invention can be more fully understood by reading the following detailed description of the embodiment, with reference made to the accompanying drawings as follows:

FIG. 2A is an enlarged view of zone "A" in FIG. 1B;

DETAILED DESCRIPTION

Figure 1A:
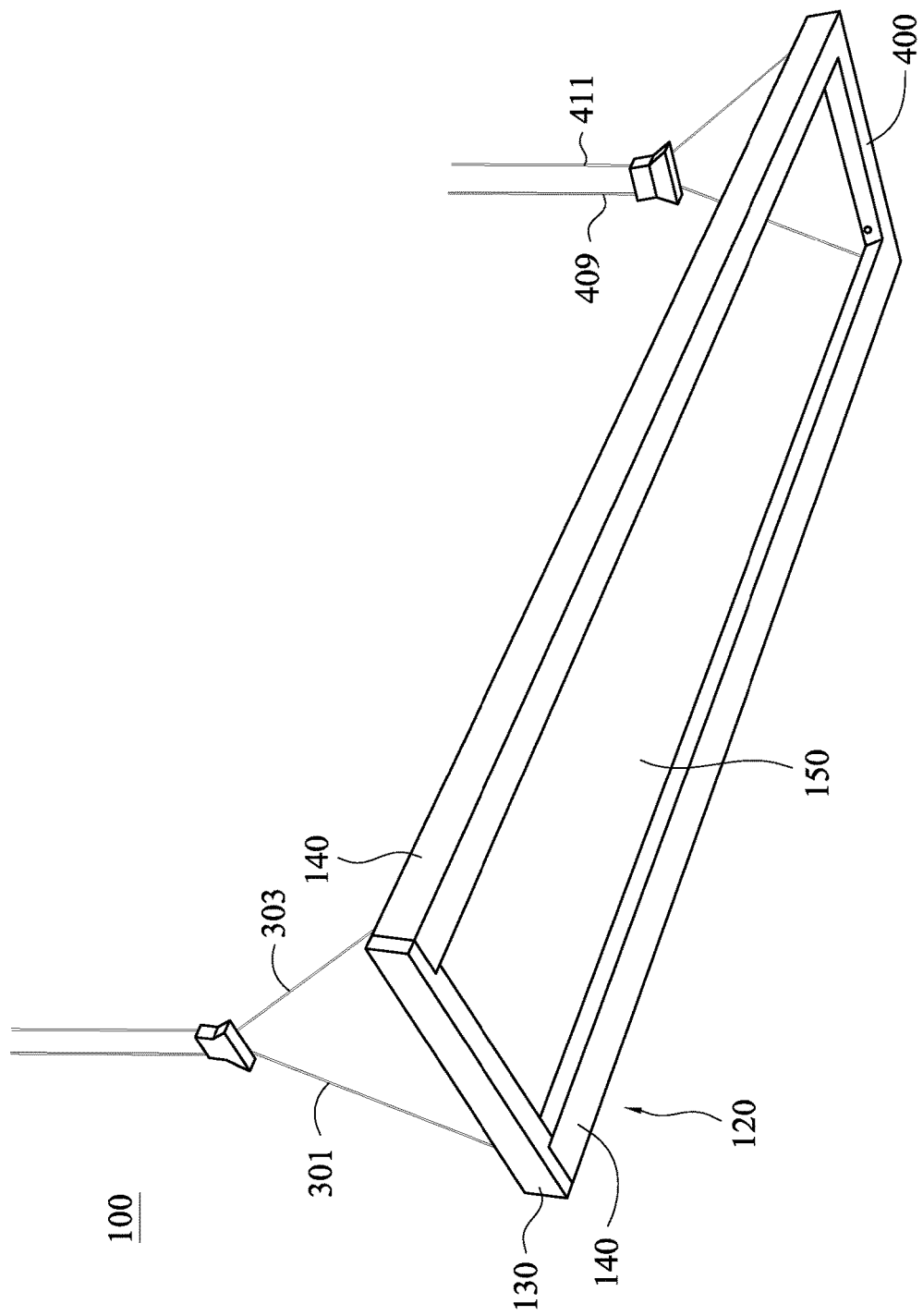
FIG. 1A is a schematic structural diagram showing a lamp in accordance with an embodiment of the present invention.
Figure 1B:
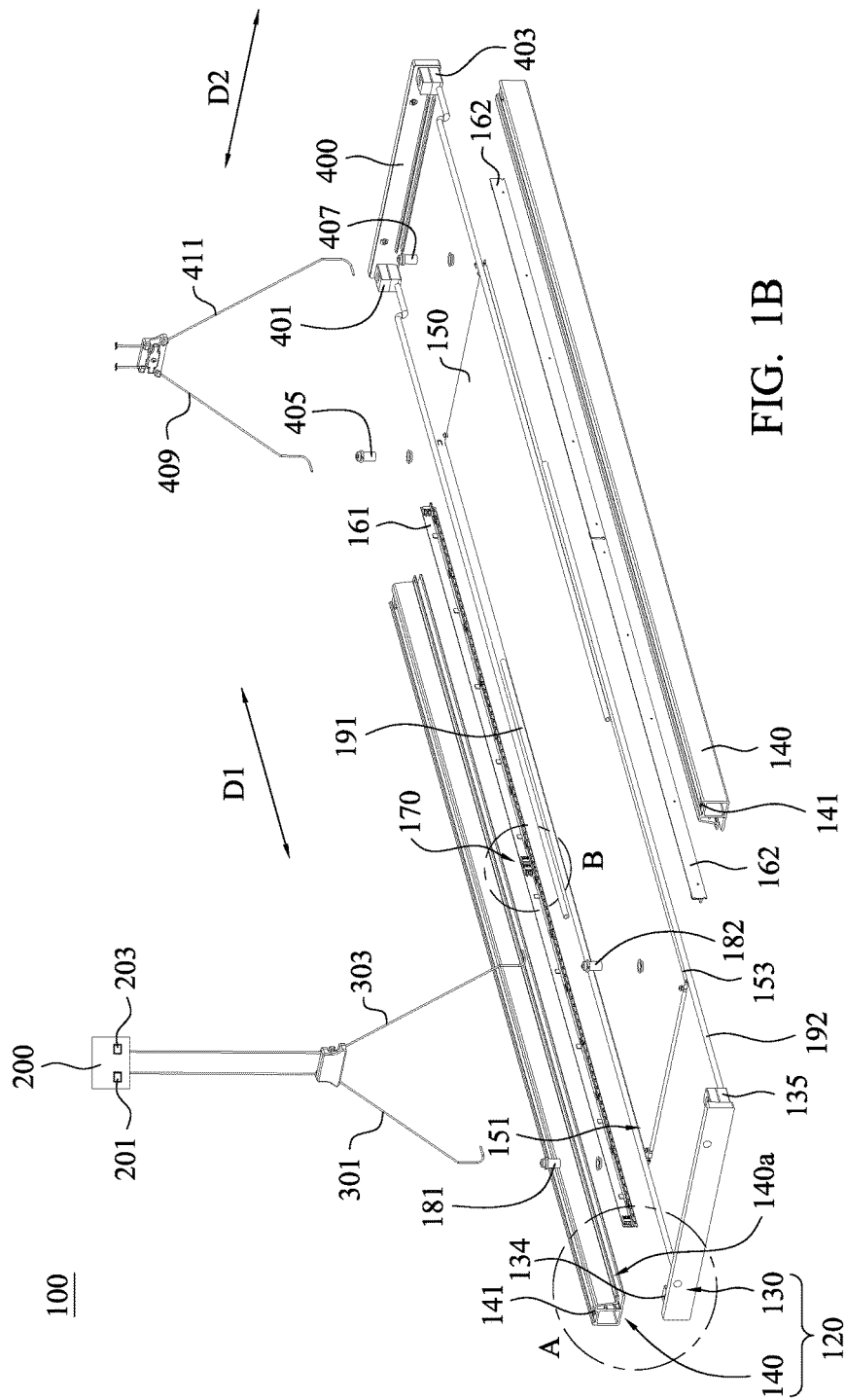
FIG. 1B is a schematic exploded view showing the lamp in accordance with an embodiment of the present invention.
Figure 2B:
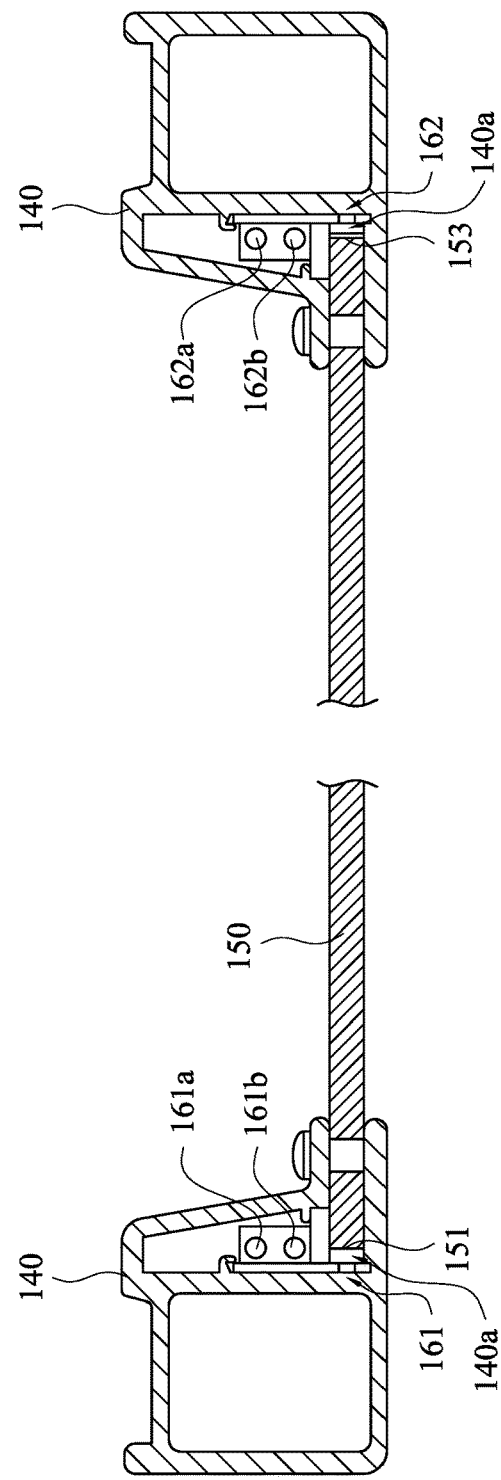
FIG. 2B is a schematic diagram showing a light guide plate disposed on side covers.
Figure 3A:
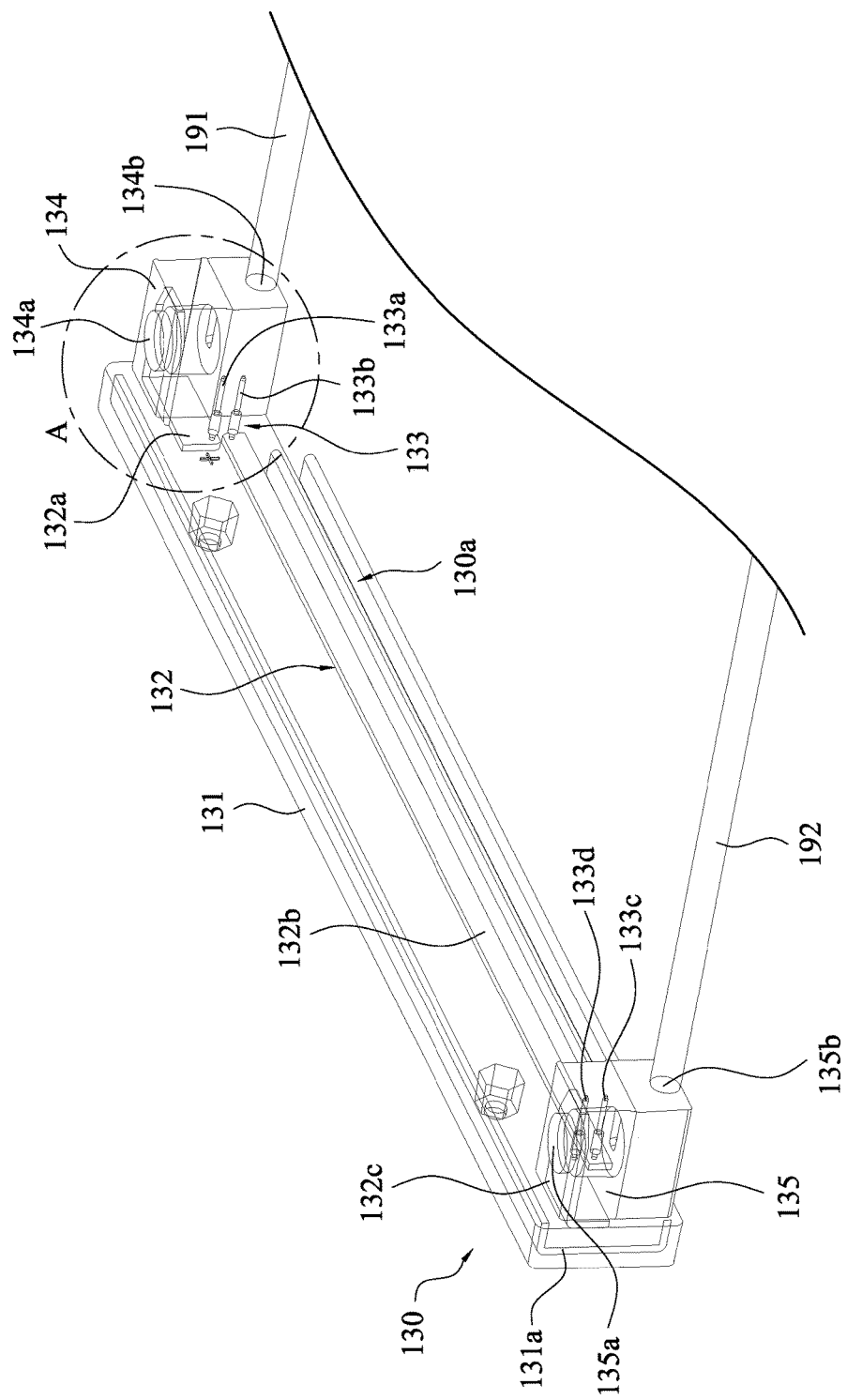
FIG. 3A is a partial structural diagram showing an integrating member in accordance with an embodiment of the present invention.

Reference will now be made in detail to the present embodiments of the invention, examples of which are illustrated in the accompanying drawings. Simultaneously referring to FIG. 1A, FIG. 1B and FIG. 2A, FIG. 1A and FIG. 1B are a schematic structural diagram and a schematic exploded view showing a lamp in accordance with an embodiment of the present invention, and FIG. 2A is an enlarged view of zone "A" in FIG. 1B. A lamp 100 mainly includes a frame body 120, a light guide plate 150 and plural light sources (i.e. a first light source 161 and a second light source 162). As shown in FIG. 1B and FIG. 2A, the frame body 120 includes at least one integrating member 130 and plural side covers 140, in which the integrating member 130 and the side covers 140 are configured to clamp and fix the light guide plate 150. In addition, simultaneously referring to FIG. 1B, FIG. 2A, FIG. 2B and FIG. 3A, in which FIG. FIG. 2B is a schematic diagram showing the light guide plate disposed on side covers, and FIG. 3A is a partial structural diagram showing the integrating member in accordance with an embodiment of the present invention. As shown in FIG. 1B and FIG. 2B, each of the side covers 140 has an accommodating area 140a. As shown in FIG. 3A, the integrating member 130 has an accommodating space 130a. In the present embodiment, side edges of the light guide plate 150 are fixed in the accommodating areas 140a and the accommodating space 130a.

Referring to FIG. 1B, FIG. 2A and FIG. 2B again, in some embodiments, each of the side covers is a heat sink. In the present embodiment, the number of the side covers 140 is two, and the side covers 140 are respectively disposed on the two opposite sides of the light guide plate 150. In the present embodiment, the first light source 161 and the second light source 162 are respectively disposed in each of the accommodating area 140a of the side cover 140. Preferably, the first light source 161 and the second light source 162 are disposed along a first direction D1. In addition, the light guide plate 150 has a first light-incident surface 151 and a second light-incident surface 153, and a portion of light guide plate 150 adjacent to the first light-incident surface 151 and a portion of light guide plate 150 adjacent to the second light-incident surface 153 are respectively located in the accommodating areas 140a of the opposite side covers 140. Therefore, light generated by the first light source 161 and the second light source 162 can enter the light guide plate 150 from the first light-incident surface 151 and the second light-incident surface 153 respectively.

Simultaneously referring to FIG. 1B to FIG. 3A, the integrating member 130 includes a main body 131, a conductive assembly 132 and plural electrical connectors 133. Preferably, the integrating member 130 is disposed along a second direction D2 which is different from the first direction D1. The conductive assembly 132 is electrically connected to a power supply 200. The electrical connectors 133 are connected to the conductive assembly 132, the first light source 161 and the second light source 162 to form an electrical loop. In other words, electrical power provided by the power supply 200 is transmitted from the integrating member 130 disposed along the second direction D2 through the conductive assembly 132 and the electrical connectors 133 to the first light source 161 and the second light source 162 disposed along the first direction D1.

Figure 3B:
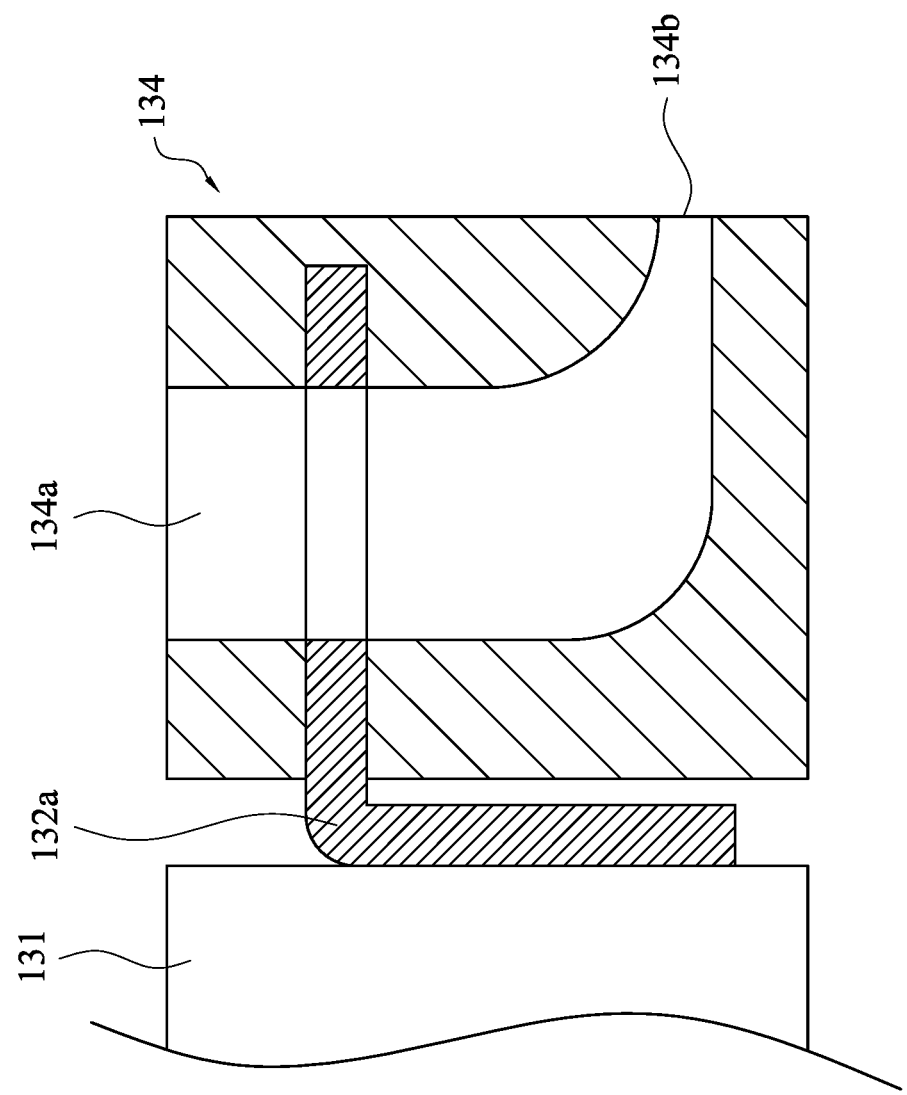
FIG. 3B is a schematic cross-sectional view of zone "A" in FIG. 3A.
Figure 3C:
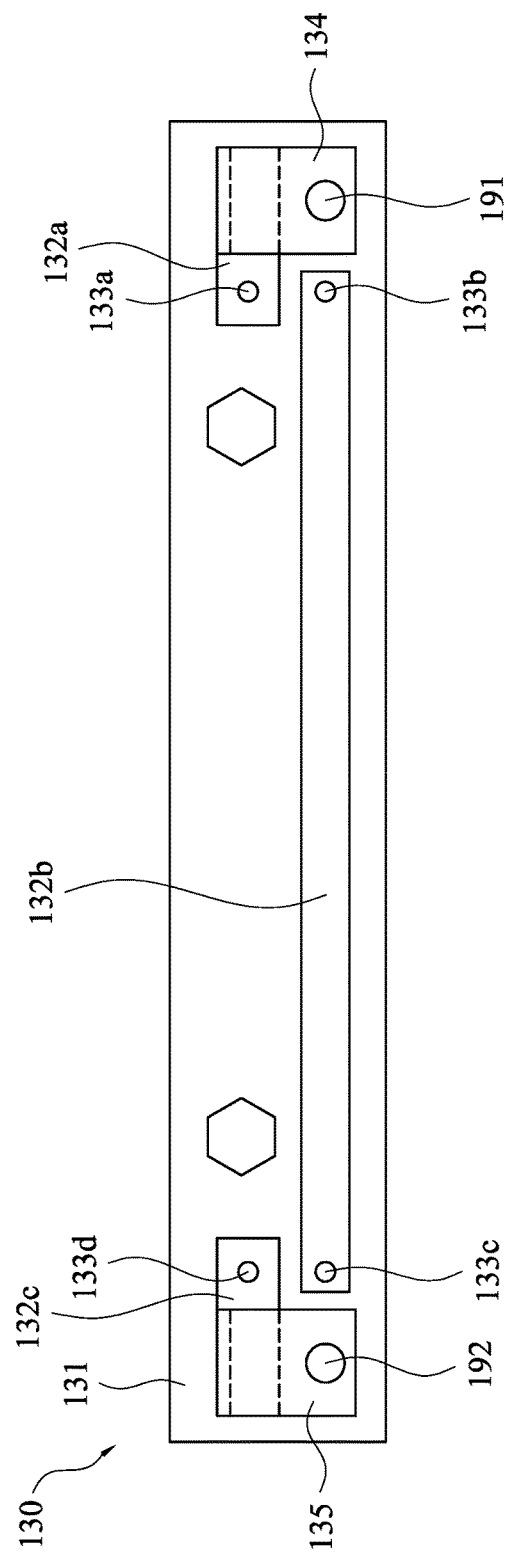
FIG. 3C is a schematic front view of FIG. 3A.

Referring to FIG. 3A to FIG. 3C, in which FIG. 3B is a schematic cross-sectional view of zone "A" in FIG. 3A, and FIG. 3C is a schematic front view of FIG. 3A. In one embodiment, the conductive assembly 132 is embedded in the main body 131. Moreover, conductive assembly 132 includes a first conductive plate 132a, a second conductive plate 132b and a third conductive plate 132c. In some examples, the main body 131 of the integrating member 130 is an insulation, and a portion of each of the first conductive plate 132a, the second conductive plate 132b and the third conductive plate 132c is disposed in the main body 131, and the other portion of each of the first conductive plate 132a, the second conductive plate 132b and the third conductive plate 132c is exposed out of the main body 131. In the present embodiment, the first conductive plate 132a and the third conductive plate 132c are respectively disposed on two ends of the main body 131, and the second conductive plate 132b is disposed between the first conductive plate 132a and the third conductive plate 132c, and the first conductive plate 132a, the second conductive plate 132b and the third conductive plate 132c are not connected to each other. In one example, the main body 131 is formed by an injection molding manner. A material used to form the main body 131 is injected into a mold to cover a portion of the conductive assembly 132, so that the conductive assembly 132 can be embedded in the main body 131. As shown in FIG. 3A, the integrating member 130 includes a reinforced plate 131a, the reinforced plate 131a is also embedded in the main body 131 but is not connected to the first conductive plate 132a, the second conductive plate 132b and the third conductive plate 132c. The reinforced plate 131a is used to increase the overall structural strength of the integrating member 130.

Referring to FIG. 3A to FIG. 3C again, a first connecting base 134 and a second connecting base 135 are respectively disposed on the two ends of the integrating member 130. In one embodiment, as shown in FIG. 3A and FIG. 3B, the first conductive plate 132a is an L-shaped structure, and a portion of the first conductive plate 132a is embedded in the first connecting base 134, and the other portion of the first conductive plate 132a is disposed on the main body 131. The third conductive plate 132c is also an L-shaped structure, and a portion of the third conductive plate 132c is embedded in the second connecting base 135, and the other portion of the third conductive plate 132c is disposed on the main body 131.

As shown in FIG. 3A and FIG. 3C, the electrical connectors 133 includes a first conductive post 133a, a second conductive post 133b, a third conductive post 133c and a fourth conductive post 133d. The first conductive post 133a is disposed on and electrically connected to the first conductive plate 132a. The second conductive post 133b and the third conductive post 133c are respectively disposed on two ends of the second conductive plate 132b and electrically connected to the second conductive plate 132b. The fourth conductive post 133d is disposed on and electrically connected to the third conductive plate 132c. In the present embodiment, the first conductive post 133a and the second conductive post 133b are disposed outside of the first connecting base 134, the third conductive post 133c and the fourth conductive post 133d are disposed outside of the second connecting base 135.

Figure 4:
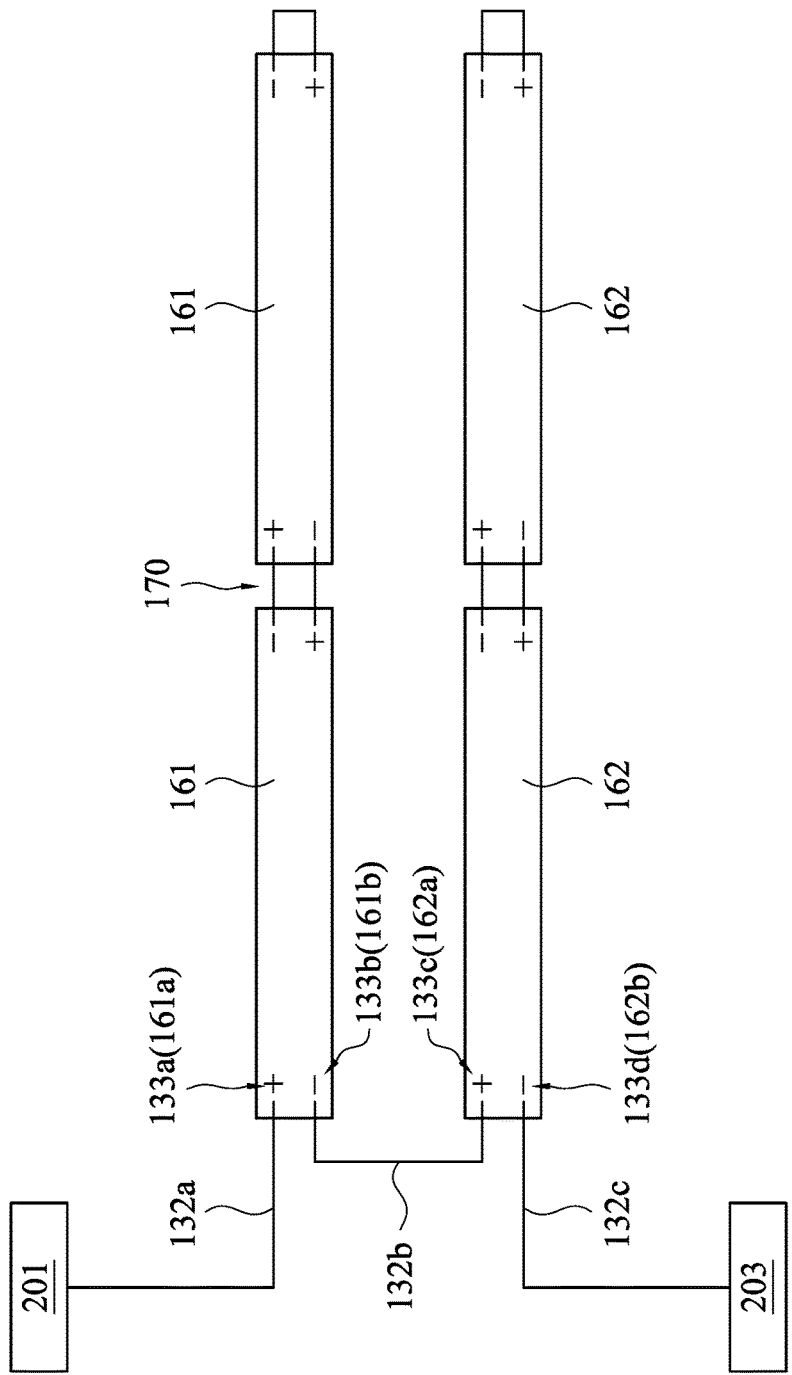
FIG. 4 is a schematic diagram showing a layout of electronic circuit of the lamp in accordance with an embodiment of the present invention.

Referring to FIG. 1B, FIG. 2A, FIG. 3A and FIG. 4, FIG. 4 is a schematic diagram showing a layout of electronic circuit of the lamp in accordance with an embodiment of the present invention. The first light source 161 has a first input terminal 161a and a first output terminal 161b, and the first conductive post 133a and the second conductive post 133b are respectively inserted into the first input terminal 161a and the first output terminal 161b. Similarly, the second light source 162 has a second input terminal 162a and a second output terminal 162b, and the third conductive post 133c and the fourth conductive post 133d are respectively inserted into the second input terminal 162a and a second output terminal 162b. In the present embodiment, the first conductive plate 132a is electrically connected to a first power supply terminal 201 of the power supply 200, and the third conductive plate 132c is electrically connected to a second power supply terminal 203 of the power supply 200. Therefore, as shown in FIG. 4, an electric current flowing out from the first power supply terminal 201 of the power supply 200 may be inputted into the first light source 161 from the first input terminal 161a via the first conductive plate 132a, and then outputted from the first output terminal 161b. The electric current flowing out from the first output terminal 161b, may flow from the second conductive post 133b to the third conductive post 133c on the second conductive plate 132b, flow into the second light source 162, and then flow back to the power supply 200 from the second output terminal 162b.

Figure 5:
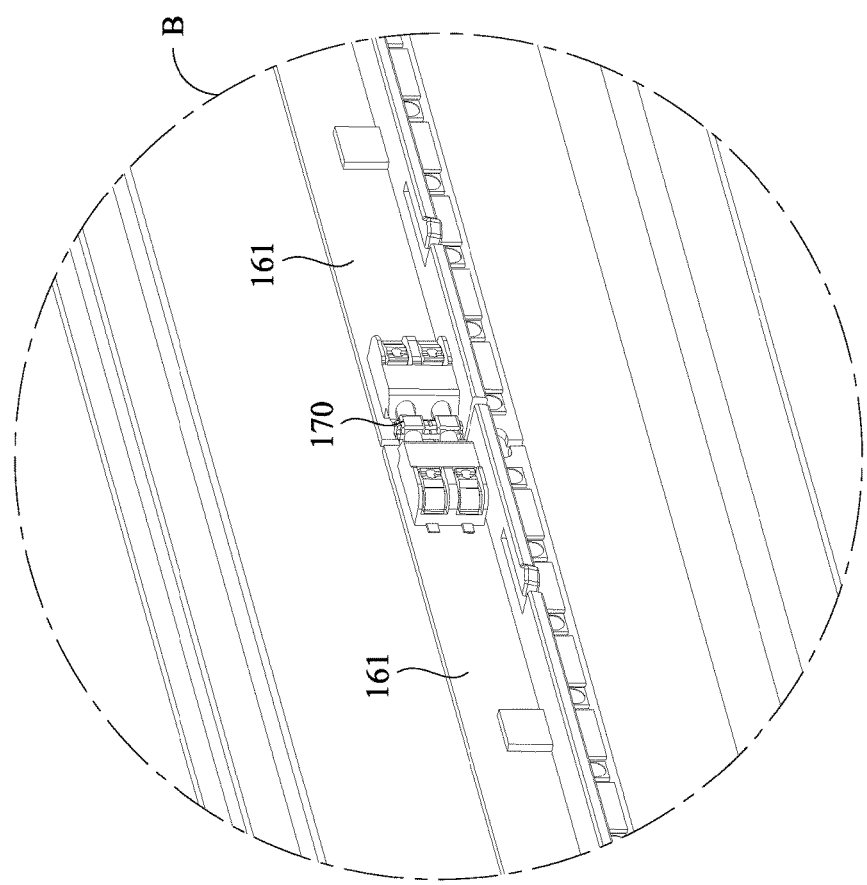
FIG. 5 is an enlarged view of zone "B" in FIG. 1B.

In addition. Simultaneously referring to FIG. 1B and FIG. 5, FIG. 5 is an enlarged view of zone "B" in FIG. 1B. In the present embodiment, the number of the first light source 161 can be two, and the first light sources 161 can be connected in series via a connector 170. In other embodiment, the number of the first light source 161 is not limited to two, and it is possible to utilize different number of first light source 161 according to a length of the side cover 140. Similarly, in other embodiments, the number of the second light source 162 can be utilized according to a length of the side cover 140.

Figure 6:
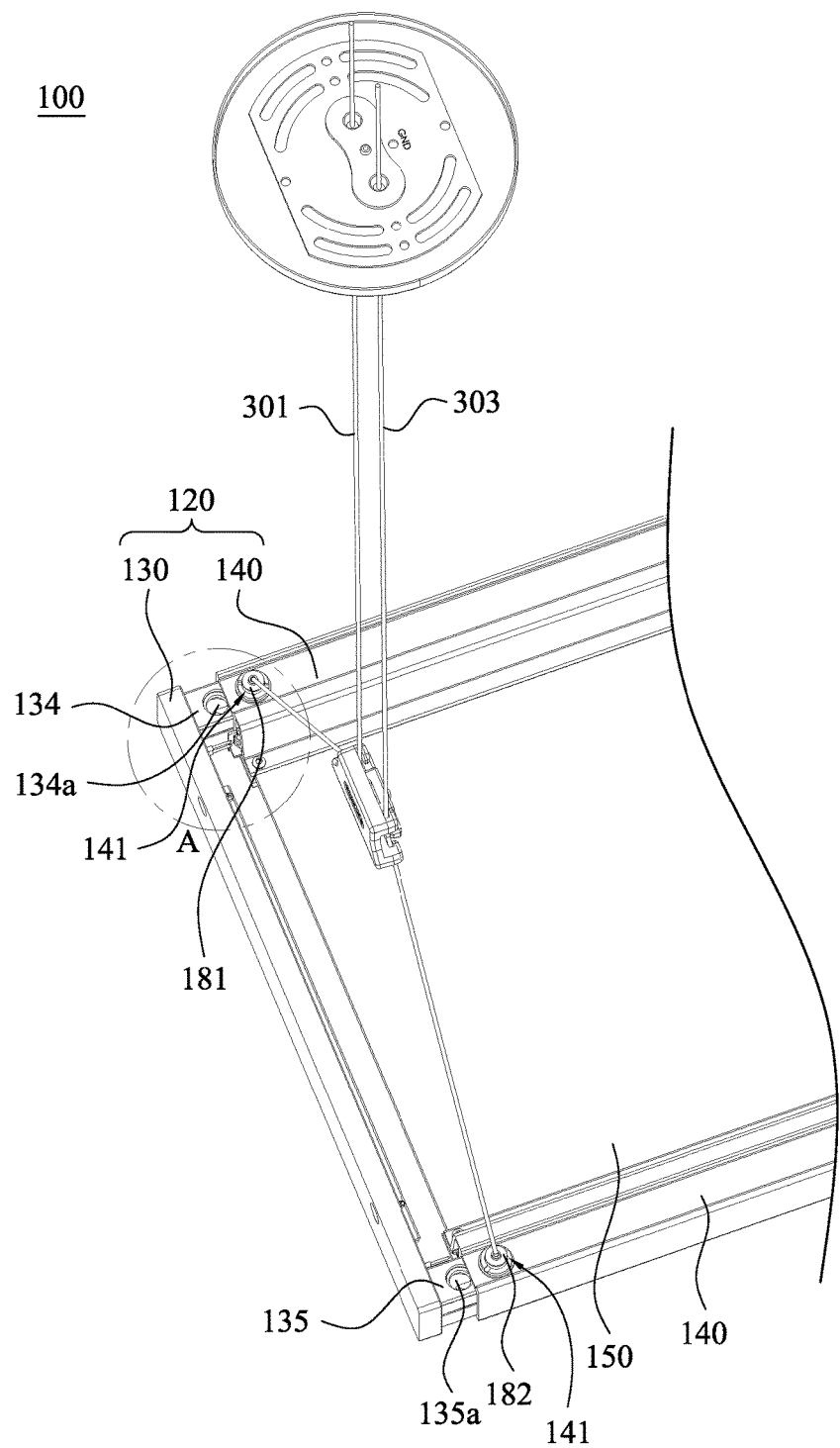
FIG. 6 is a partial exploded view showing the lamp in accordance with an embodiment of the present invention.
Figure 7:
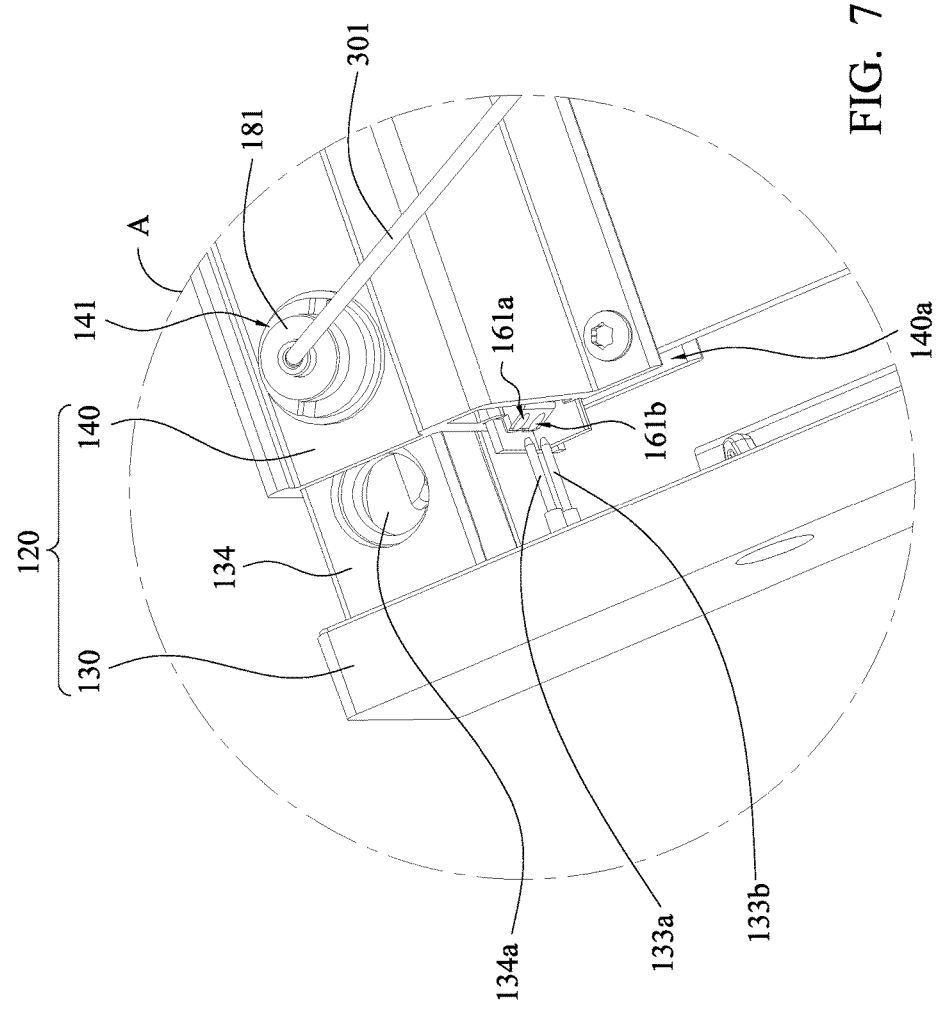
FIG. 7 is an enlarged view of zone "A" in FIG. 6.

Referring to FIG. 3A, FIG. 6 and FIG. 7, FIG. 7 is an enlarged view of zone "A" in FIG. 6. In one embodiment, a through hole 134a and a through hole 134b are respectively disposed on a top surface and a side surface of the first connecting base 134, in which the through hole 134a communicates with the through hole 134b. In the present embodiment, the through hole 134a is configured to dispose a first conductive base 181. As shown in FIG. 3A, FIG. 6 and FIG. 7, the side cover 140 can be a tube structure, and one end of the side cover 140 is disposed on the first connecting base 134. After inserted into a through hole 141 of the side cover 140 and the first conductive plate 132a, the first conductive base 181 is fixed in the through hole 134a and is connected to the first conductive plate 132a.

Referring to FIG. 1B, FIG. 3A and FIG. 7 again, in the present embodiment, the first conductive base 181 can be used to fix a first charged cable 301, and the first charged cable 301 is connected to the first power supply terminal 201 of the power supply 200. In one embodiment, one end of the first charged cable 301 is connected to the first power supply terminal 201 of the power supply 200, and the other end is fixed on the first connecting base 134 and is connected to the first conductive plate 132a. As shown in FIG. 1B and FIG. 3A, in some embodiments, the lamp 100 further includes a first tube 191. The first tube 191 is connected to the through hole 134b of the first connecting base 134. When one end of the side cover 140 is disposed on the first connecting base 134, the first tube 191 is located in the side cover 140. Therefore, as shown in FIG. 1B, FIG. 3A and FIG. 7, one end of the first charged cable 301 is inserted into the through hole 134a and the through hole 134b from the first conductive base 181, and extends in the first tube 191, so that a portion of the first charged cable 301 can be hidden in the first tube 191 and the side cover 140.

Referring to FIG. 1B, FIG. 3A and FIG. 6, in one embodiment, a through hole 135a and a through hole 135b are respectively disposed on a top surface and a side surface of the second connecting base 135, in which the through hole 135a communicates with the through hole 135b. In the present embodiment, the through hole 135a is configured to dispose a second conductive base 182. As shown in FIG. 6, the side cover 140 can be a tube structure, and one end of the side cover 140 is disposed on the second connecting base 135. After inserted into the through hole 141 of the side cover 140 and the third conductive plate 132c, the second conductive base 182 is fixed in the through hole 135a of the second connecting base 135 and is connected to the third conductive plate 132c.

Referring to FIG. 1B, FIG. 3A, and FIG. 6 again, in the present embodiment, the second conductive base 182 can be used to fix a second charged cable 303, and the second charged cable 303 is connected to the second power supply terminal 203 of the power supply 200. In one embodiment, one end of the second charged cable 303 is connected to the second power supply terminal 203 of the power supply 200, and the other end is fixed on the second connecting base 135 and is connected to the third conductive plate 132c. As shown in FIG. 1B and FIG. 3A, in some embodiments, the lamp 100 further includes a second tube 192. The second tube 192 is connected to the through hole 135b of the second connecting base 135. When one end of another side cover 140 is disposed on the second connecting base 135, the second tube 192 is located in the side cover 140. Therefore, as shown in FIG. 7, one end of the second charged cable 303 is inserted into the through hole 135a and the through hole 135b from the second conductive base 182, and extends in the second tube 192, so that a portion of the second charged cable 303 can be hidden in the second tube 192 and the side cover 140.

From the embodiments, it can be known that, the electric current flowing out from the first power supply terminal 201 of the power supply 200 may be inputted into the first light source 161 from the first conductive post 133a and then outputted from the second conductive post 133b. The electric current flowing out from the second conductive post 133b, may flow from the second conductive post 133b to the third conductive post 133c on the second conductive plate 132b, flow into the second light source 162, and then flow from the fourth conductive post 133d back to the power supply 200.

Referring to FIG. 1B again, the frame body 120 further includes an assembly frame 400. The assembly frame 400 and the integrating member 130 are respectively disposed on two opposite sides of the light guide plate 150. The structure of the assembly frame 400 is similar to that of the integrating member 130, and the main difference therebetween is that the assembly frame 400 is not electrically connected to the first light source 161, the second light source 162 and the light source 200. As shown in FIG. 1B, the assembly frame 400 includes a first assembly base 401 and a second assembly base 403. Therefore, one end of one of side cover 140 can be disposed on the first connecting base 134 of integrating member 130, the other end can be disposed on the first assembly base 401 of the assembly frame 400. Similarly, one end of another side cover 140 can be disposed on the second connecting base 135 of integrating member 130, the other end can be disposed on the second assembly base 403 of the assembly frame 400.

Referring to FIG. 1B, a first non-conductive base 405 and a second non-conductive base 407 are respectively disposed on the first assembly base 401 and the second assembly base 403. Moreover, a first uncharged cable 409 and a second uncharged cable 411 are respectively connected to the first assembly base 401 and the second assembly base 403 via first non-conductive base 405 and the second non-conductive base 407.

Figure 8:
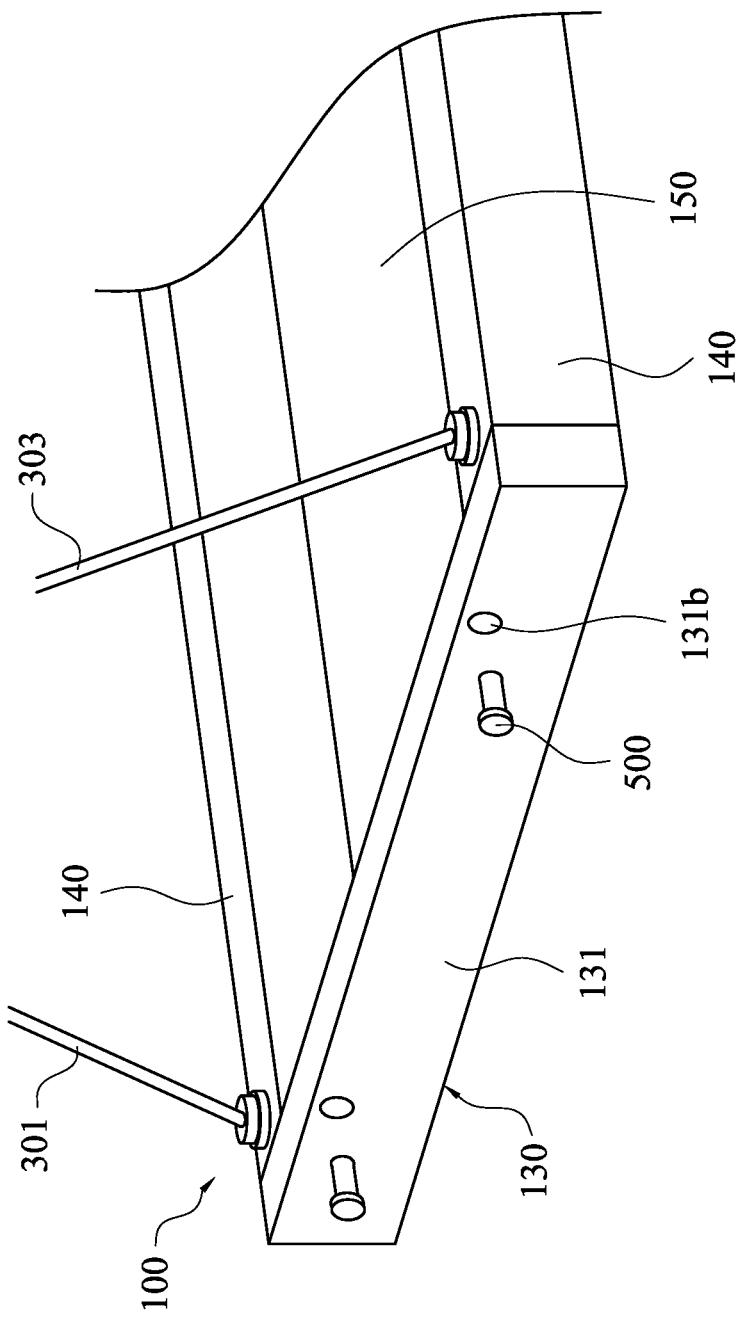
FIG. 8 is a partial structural diagram showing the lamp in accordance with an embodiment of the present invention.
Figure 9:
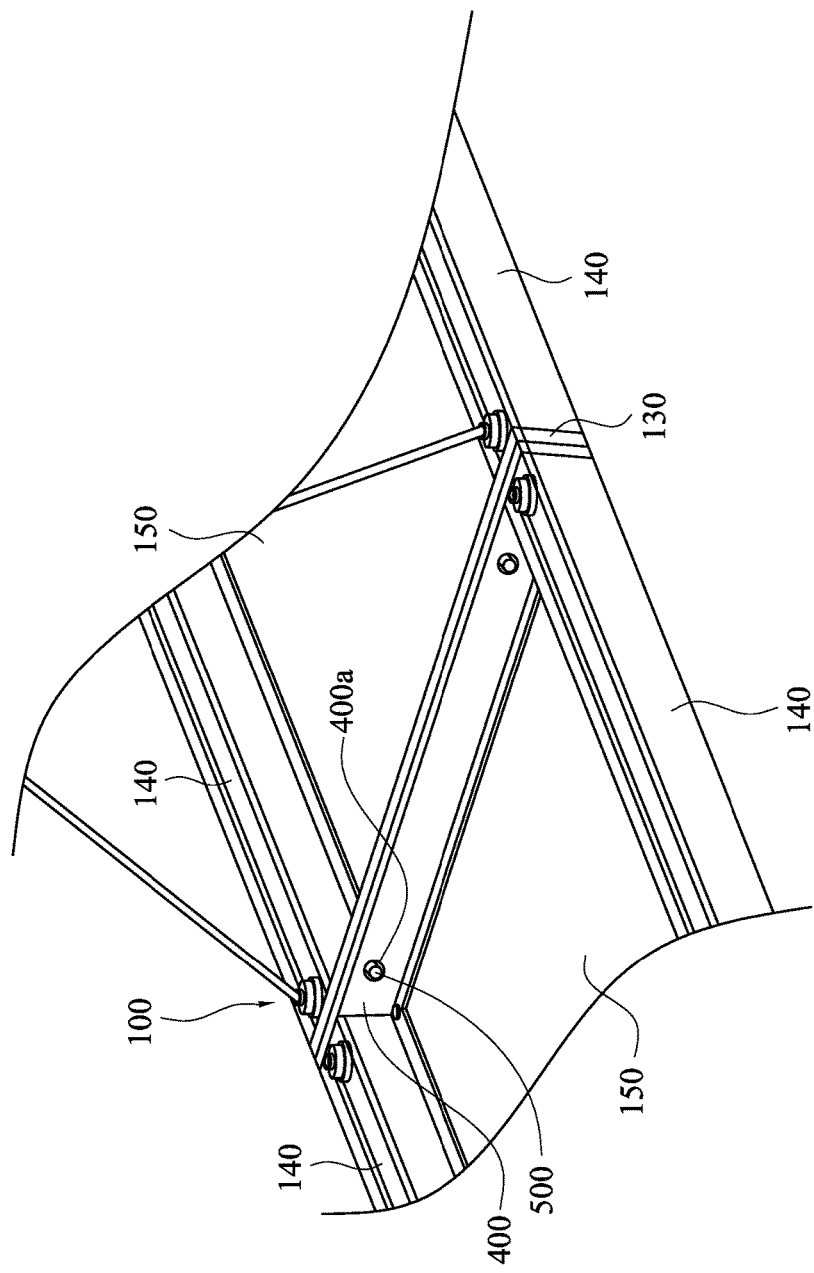
FIG. 9 is a schematic diagram showing multiple lamps jointed together in accordance with an embodiment of the present invention.

In addition, referring to FIG. 8 and FIG. 9, FIG. 8 is a partial structural diagram showing the lamp in accordance with an embodiment of the present invention, and FIG. 9 is a schematic diagram showing multiple lamps jointed together in accordance with an embodiment of the present invention. As shown in FIG. 8 and FIG. 9, two adjacent lamps 100 can be jointed together by fixing members 500. In some embodiments, the main body 131 of the integrating member 130 has plural fixing holes 131b (as shown in FIG. 8), and the assembly frame 400 also has plural fixing holes 400a (as shown in FIG. 9). Therefore, adjacent lamps 100 can be jointed together by inserting and fixing the fixing member 500 in the fixing hole 400a of the assembly frame 400 and the fixing hole 131b of the of the integrating member 130 of another lamp 100. It is noted that the fixing holes 131b are disposed above and separated from the conductive assembly 132 on the main body 131. In addition, because the main body 131 is an insulation, when fixed on the integrating member 130, the fixing members 500 will not conduct electricity with the conductive assembly 132.

According to the aforementioned embodiments of the present invention, the present invention uses the integrating member to integrate and simplify the electrical loop in the lamp. Moreover, the light sources and the power supply can be electrically connected by using the conductive assembly without needing to use electric wires, thereby simplifying the structure of the lamp and reducing assembling time and manufacture cost.

Figure 10:
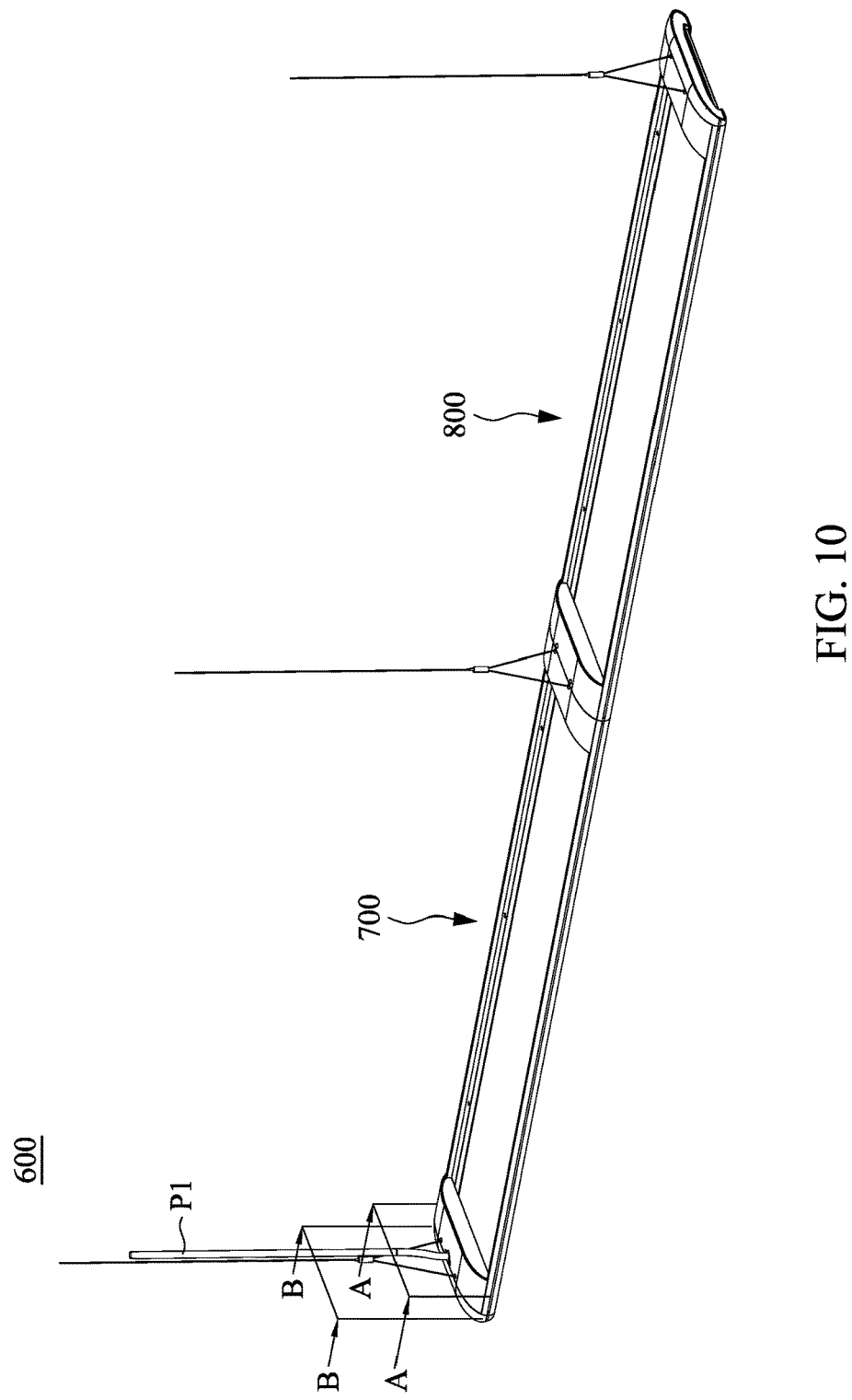
FIG. 10 is a schematic structural diagram showing a lamp system in accordance with an embodiment of the present invention.
Figure 11:
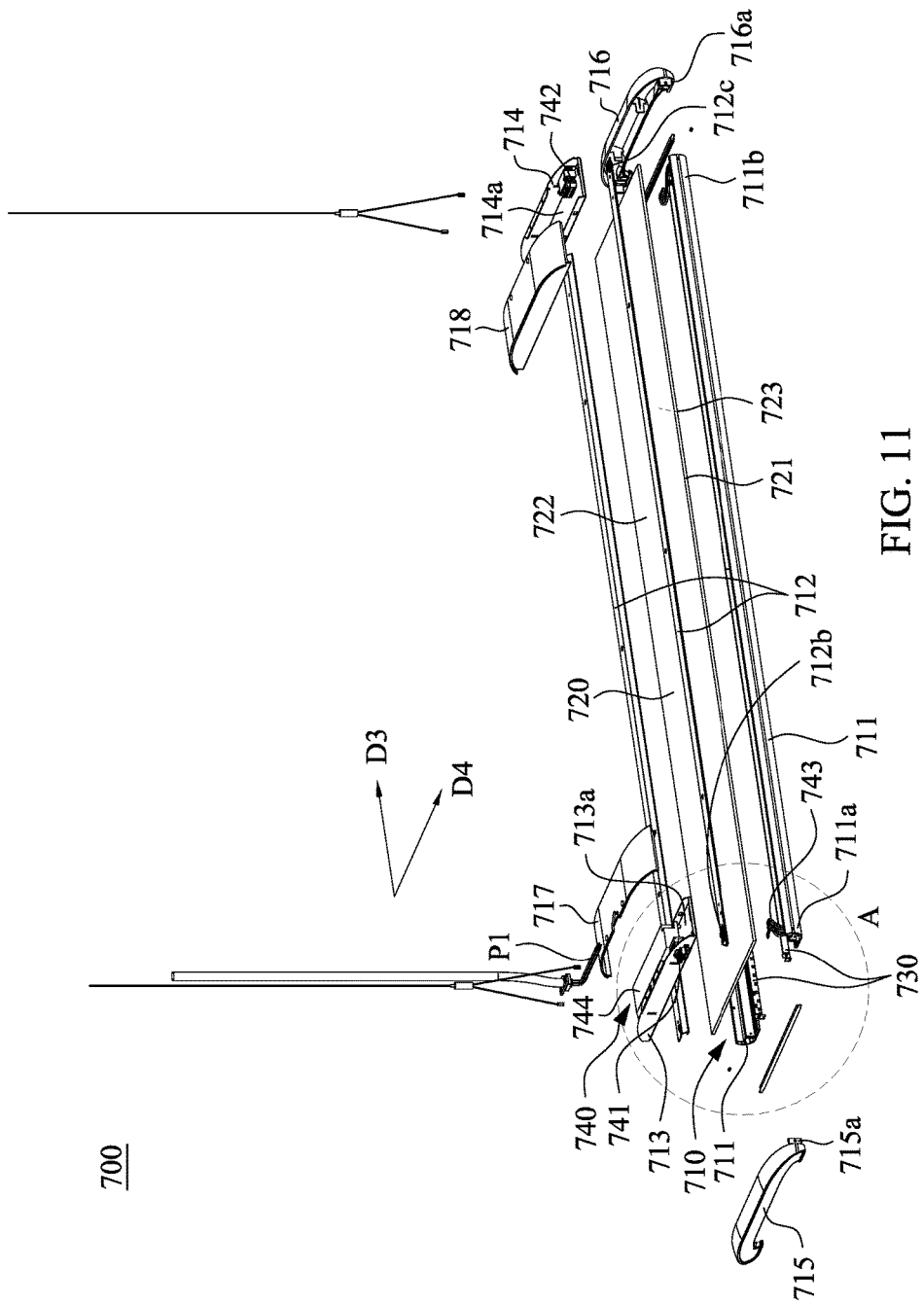
FIG. 11 is a schematic exploded view of a lamp in accordance with an embodiment of the present invention.

Simultaneously referring to FIG. 10 and FIG. 11, FIG. 10 is a schematic structural diagram showing a lamp system 600 in accordance with an embodiment of the present invention, and FIG. 11 is a schematic exploded view of a lamp 700 in accordance with an embodiment of the present invention. The lamp system 600 of the present embodiment is mainly constituted by at least two lamps (such as the lamp 700 and a lamp 800) connected in series. The lamp 700 mainly includes a frame body 710, a light guide plate 720, at least one light source 730, and a circuit assembly 740. The frame body 710 includes two opposite side covers 711, two opposite side bars 712, a first integrating member 713, a second integrating member 714, a first decorative cover 715, a second decorative cover 716, a first upper cover 717 and a second upper cover 718.

Figure 12:
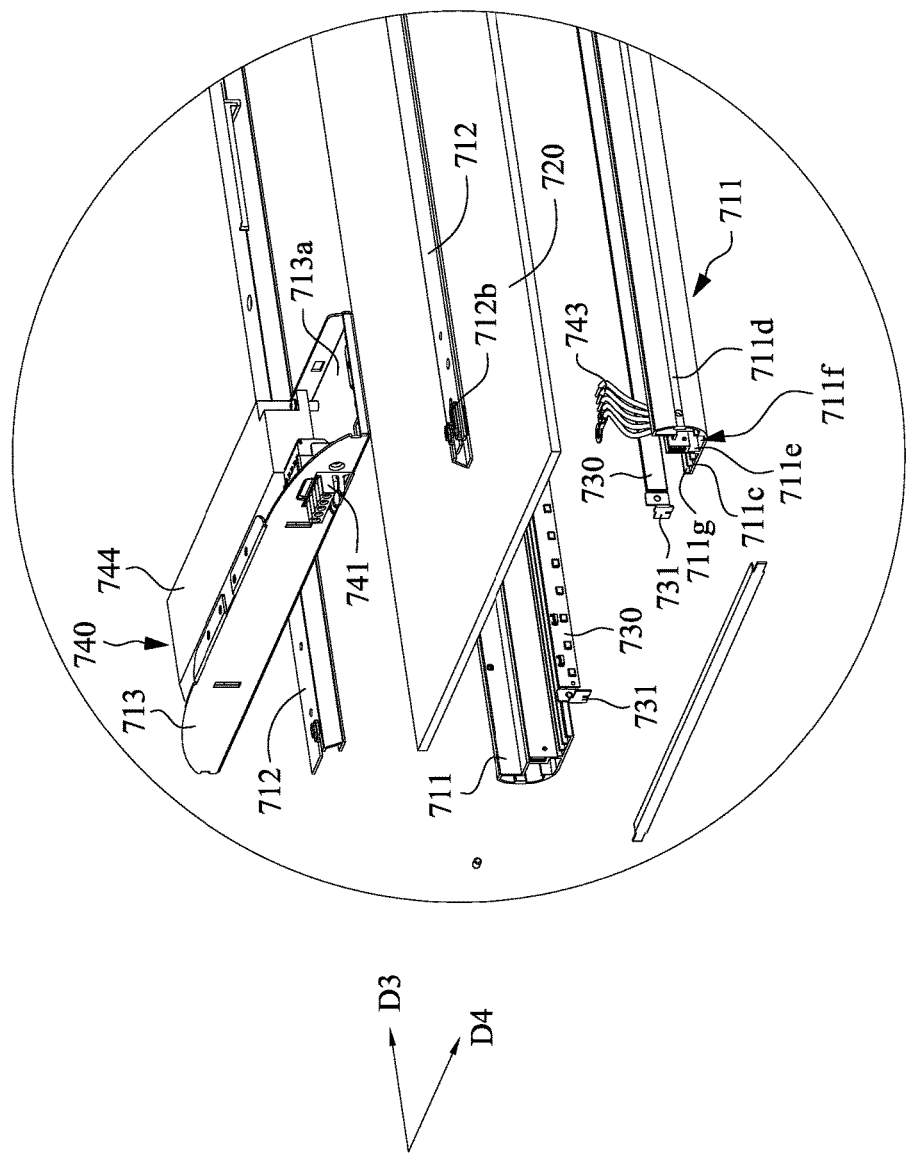
FIG. 12 is a schematic diagram showing an enlarged portion labeled with detail "A" in FIG. 11.

Simultaneously referring to FIG. 11 and FIG. 12, FIG. 12 is a schematic diagram showing an enlarged portion labeled with detail "A" in FIG. 11. In one embodiment, each of the side covers 711 extends along a first direction D3 (i.e. X-direction), and each of the side covers 711 has a first end 711a and a second end 711b opposite to the first end 711a. Each of the side covers 711 includes a carrying portion 711c, a sidewall 711d and a partition plate 711e. The sidewall 711d is connected to a side edge of the carrying portion 711c, and the partition plate 711e is vertically disposed on the carrying portion 711c so as to form an accommodating channel 711f between the partition plate 711e and the sidewall 711d. The light source 730 is disposed on the partition plate 711e, and is engaged in a groove 711g of the carrying portion 711c. In one embodiment, the light source 730 is an LED light bar, and the LED light bar has two clamping plates 731 disposed on two opposite ends of the LED light bar, and the clamping plates 731 are fixed on the groove 711g of the carrying portion 711c.

Figure 13:
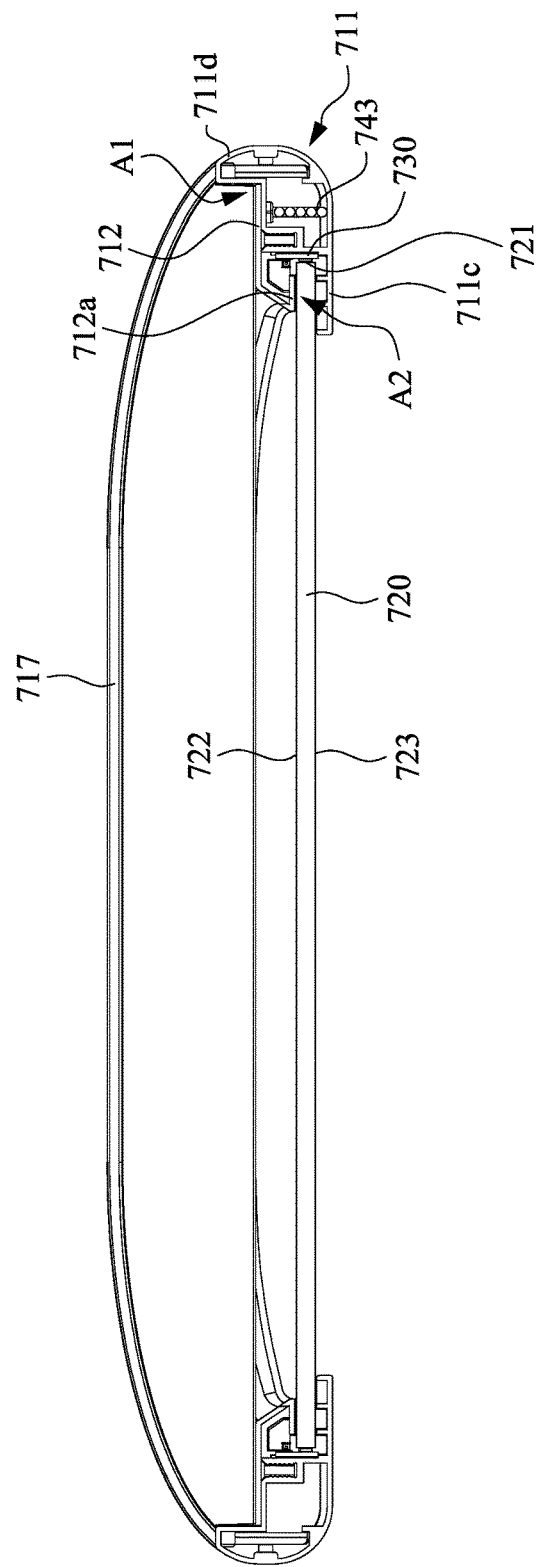
FIG. 13 is a schematic cross-sectional view taken along line A-A in FIG. 10.

Simultaneously referring to FIG. 11 to FIG. 13, FIG. 13 is a schematic cross-sectional view taken along line A-A in FIG. 10. The side bars 712 extend along the first direction D3. The side bars 712 are fixed on the side covers 711 respectively, and each of the two side covers 711 is partitioned into an upper space A1 and a lower space A2 by its corresponding side bar 712. More specifically, the upper space A1 is defined as a space surrounded by a top surface of the side bar 712 and the sidewall 711d of the side cover 711, and the lower space A2 is defined as a space surrounded by a bottom surface of the side bar 712 and carrying portion 711c of the side cover 711. In some embodiments, each of the side bars 712 has a folding portion 712a, and the lower space A2 is defined as a space surrounded by the folding portion 712a of the side bar 712 and the carrying portion 711c of the side cover 711.

Referring to FIG. 11 to FIG. 13 again, the light guide plate 720 is disposed in the lower space A2 and is located between the folding portion 712a and the carrying portion 711c. The light guide plate 720 has at least one side surface 721, a first light-emitting surface 722 and a second light-emitting surface 723, in which the first light-emitting surface 722 and the second light-emitting surface 723 are respectively connected to two opposite sides of the side surface 721, and the first light-emitting surface 722 and the second light-emitting surface 723 are respectively faced upwardly and downwardly. In the present embodiment, a portion of the light guide plate 720 near the side surface 721 is located between the folding portion 712a of the side bar 712 and the carrying portion 711c of the side cover 711. Moreover, the side surface 721 is a light-incident surface which is disposed adjacent to the light source 730 located on the carrying portion 711c. In other words, only portions of the first light-emitting surface 722 and the second light-emitting surface 723 of the light guide plate 720 near side surface 721 are located between the side bar 712 and the side cover 711 (I.e. only the portions of the first light-emitting surface 722 and the second light-emitting surface 723 near side edge are covered by the frame body 710, and no component blocks the light emitted from the first light-emitting surface 722 faced upwardly).

Figure 14:
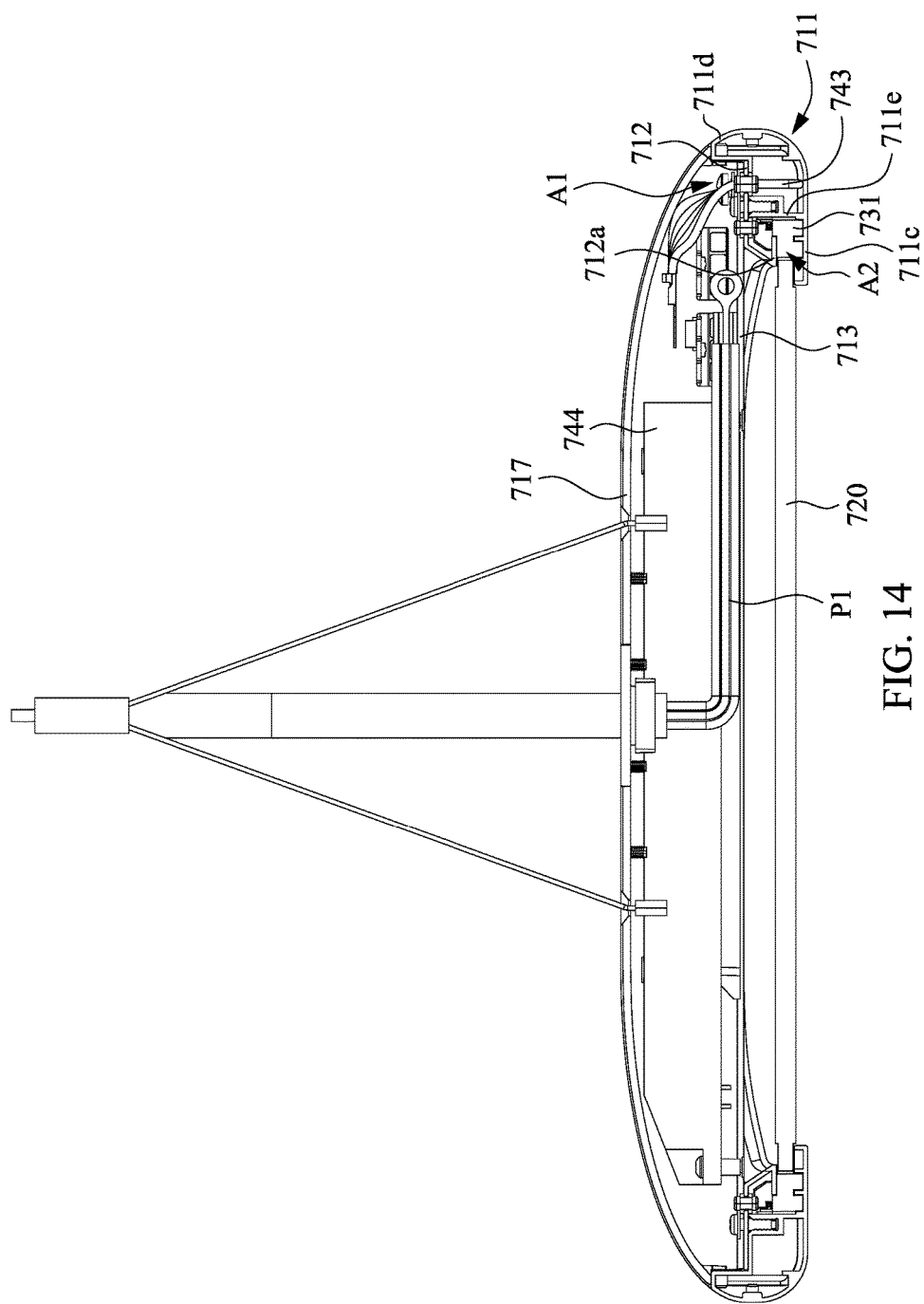
FIG. 14 is a schematic cross-sectional view taken along line B-B in FIG. 10.

Simultaneously referring to FIG. 11, FIG. 12 and FIG. 14, FIG. 14 is a schematic cross-sectional view taken along line B-B in FIG. 10. In the present embodiment, the first integrating member 713 and the second integrating member 714 are end caps. The first integrating member 713 and the second integrating member 714 extend along a second direction D4 (i.e. Y-direction). The first integrating member 713 is disposed on the upper space A1 of the side cover 711 and is connected to the first ends 711a of the side covers 711. The second integrating member 714 is disposed on the upper space A1 of the side cover 711 and is connected to the second ends 711b of the side cover 711. In one embodiment, as shown in FIG. 11, the first integrating member 713 has a first installation space 713a, and the second integrating member 714 has a second installation space 714a. The first installation space 713a and the second installation space 714a are configured to accommodate some components of the circuit assembly 740.

In the present embodiment, the circuit assembly 740 is disposed on the frame body 710 and is connected to the light source 730 to form an electrical loop. In one embodiment, the circuit assembly 740 includes a first connector 741, a second connector 742, a bundle of wires 743 and a driver 744. In one embodiment, the first connector 741 and the second connector 742 are couple mechanisms. The first connector 741 and the driver 744 are disposed in the first installation space 713a of the first integrating member 713, and the second connector 742 is disposed in the second installation space 714a of the second integrating member 714. The wires 743 are disposed in the accommodating channel 711f of one of the side cover 711, in which one end of the bundle of wires 743 extends into a first through hole 712b of the side bar 712 to be connected to the first connector 741, and the other end of the bundle of wires 743 extends into a second through hole 712c of the side bar 712 to be connected to the second connector 742. The driver 744 is used to convert the alternating current (AC) to direct current (DC) which can be used by the light source 730. In some embodiments, the driver 744 also can be disposed in the second installation space 714a.

Figure 15A:
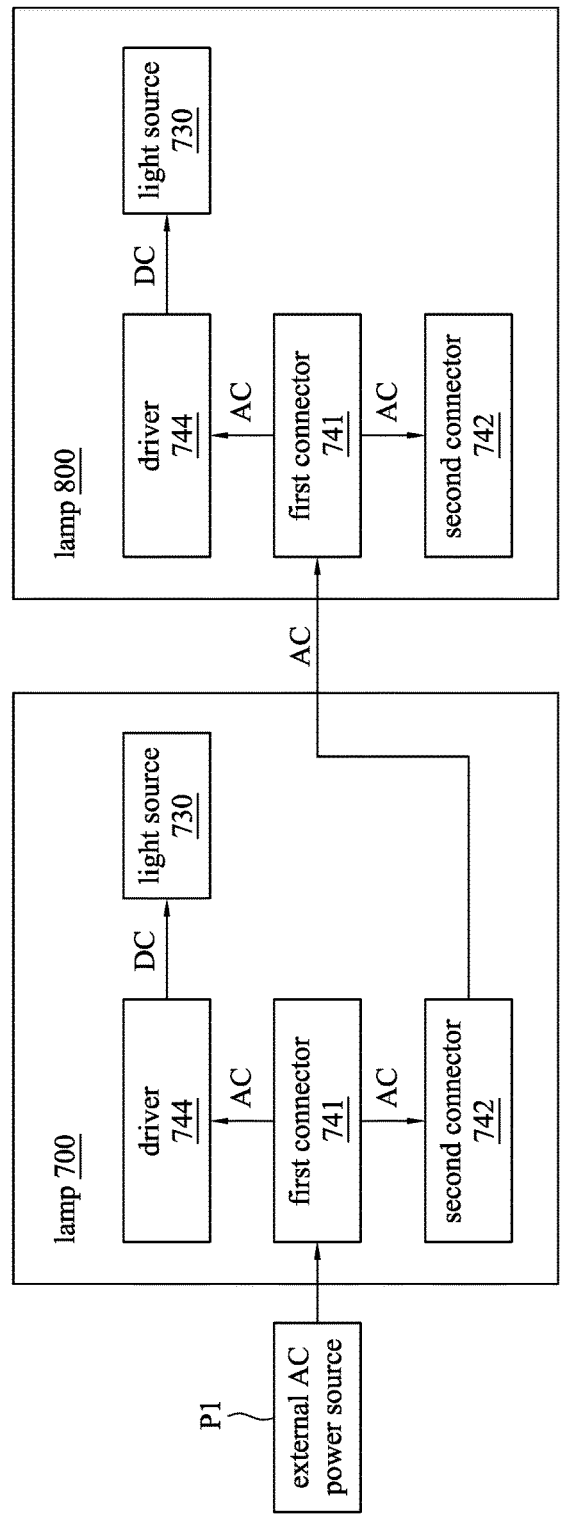
FIG. 15A is a block diagram showing lamps in a series-connection state in accordance with an embodiment of the present invention.
Figure 15B:
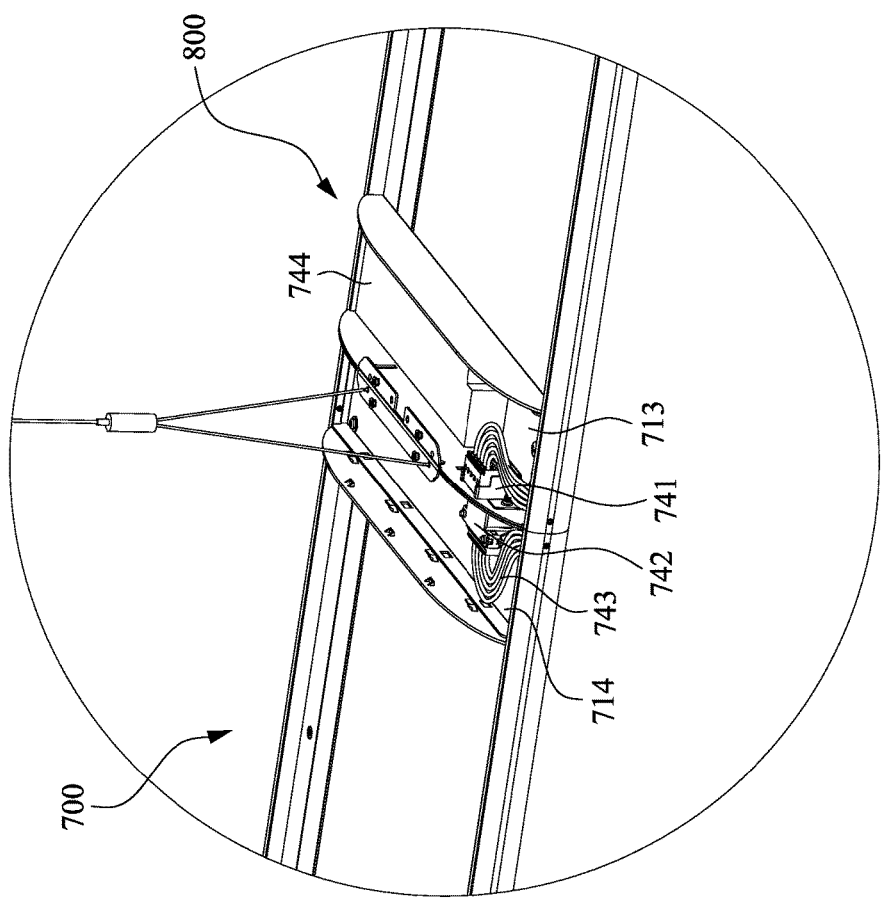
FIG. 15B is a schematic structural diagram showing the lamps in the series-connection state in accordance with an embodiment of the present invention.

Simultaneously referring to FIG. 11, FIG. 15A and FIG. 15B, FIG. 15A and FIG. 15B are a block diagram and a schematic structural diagram showing the lamps 700 and 800 in a series-connection state in accordance with an embodiment of the present invention. It is noted that, the lamp 700 and the lamp 800 have substantially the same structures, and the same reference numbers used in the drawings and the description are referred to the same or like parts. In the present embodiment, the lamp 700 is the first lamp (i.e. the lamp nearest a power source). When the lamp 700 and the lamp 800 are connected together, the second connector 742 of the lamp 700 is connected to the first connector 741 of the lamp 800, and the first connector 741 of the lamp 700 is connected to an external AC power source P1. The alternating current provided by the external AC power source P1 is distributed to the driver 744 of the lamp 700 and the second connector 742 of the lamp 700 through the first connector 741 of the lamp 700. Therefore, the alternating current transmitted to the driver 744 of the lamp 700 is converted to direct current which can be used by the light source 730 of the lamp 700. In addition, the alternating current transmitted to the second connector 742 of the lamp 700 is further transmitted to the lamp 800, thereby forming an electrical loop between the lamp 700 and the lamp 800. Similarly, the alternating current transmitted from the lamp 700 is distributed to the driver 744 of the lamp 800 by the first connector 741 of the lamp 800, and the driver 744 of the lamp 800 further converts the alternating current to direct current which can be used by the light source 730 of the lamp 800. In other embodiments, if there is another lamp connected to the lamp 800, the alternating current transmitted to the first connector 741 of the lamp 800 is further transmitted to the second connector 742 of the lamp 800 by the wire 743, so as to be transmitted to the another lamp.

In some embodiments, the first connector 741 of the lamp 700 is a 3-WAY quick terminal connector (as shown in FIG. 14) which is disposed inside the lamp 700 without being exposed to outside. A wire of the external AC power source P1 extends into the lamp 700, and the alternating current is distributed from the first connector 740 to the driver 744 of the lamp 700 and the second connector 742 of the lamp 700 by using the 3-WAY quick terminal connector. On the other hand, the first connector 741 of the lamp 800 is a connector splitter, and a joint portion of the connector splitter is exposed externally so as to be easily coupled to a joint portion of the second connector 742 of the lamp 700, such that the alternating current can be transmitted from the lamp 700 to the lamp 800.

Referring to FIG. 11 again, the first decorative cover 715 is used to cover a side surface of the first integrating member 713 and the accommodating channels 711f, and the first decorative cover 715 has a first engaging portion 715a engaged in the accommodating channels 711f. The second decorative cover 716 is used to cover a side surface of the second integrating member 714 and the accommodating channels 711f, and the second decorative cover 716 has a second engaging portion 716a engaged in the accommodating channels 711f. In addition, the first upper cover 717 covers the first integrating member 713 and the first ends 711a of the side covers 711, the second upper cover 718 covers the second integrating member 714 and the second end 711b of the side covers 711.

Figure 16:
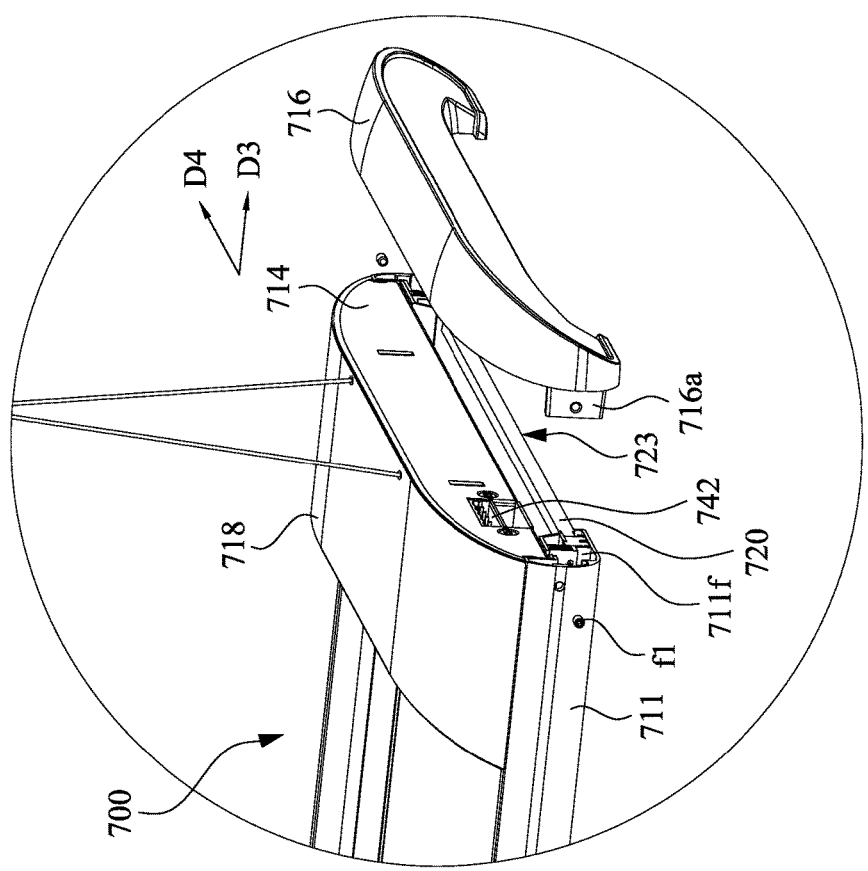
FIG. 16 is a schematic structural diagram showing a second decorative cover removed from a lamp in accordance with an embodiment of the present invention.
Figure 17:
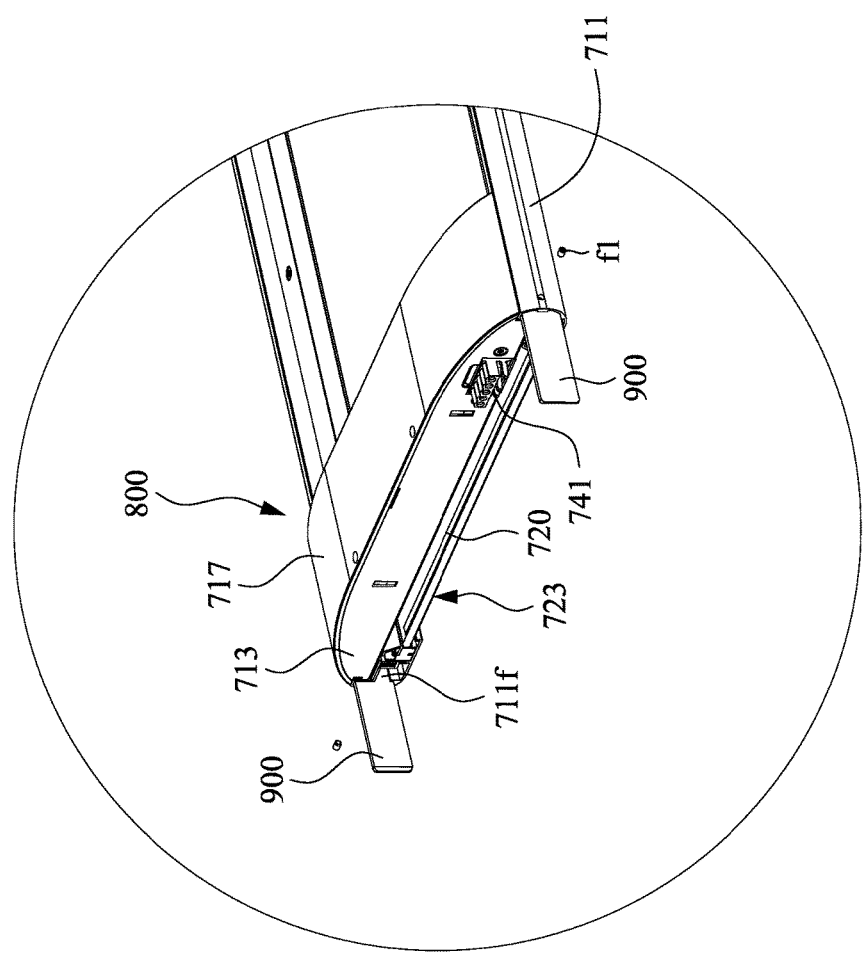
FIG. 17 is a schematic structural diagram showing supporting bars disposed in accommodating channel of a lamp.

Based on the above, the present invention further provides a method for assembling lamp system. Referring to FIG. 11, FIG. 16, and FIG. 17, FIG. 16 is a schematic structural diagram showing the second decorative cover 716 removed from the lamp 700 in accordance with an embodiment of the present invention, and FIG. 17 is a schematic structural diagram showing supporting bars 900 disposed in the accommodating channels 711f of the lamp 800. The method mainly includes the following steps. At first, at least two aforementioned lamps, such as the lamp 700 and the lamp 800, are provided. Thereafter, as shown in FIG. 16, the second decorative cover 716 of the lamp 700 is removed, and the first decorative cover 715 of the lamp 800 is removed. Then, as shown in FIG. 17, at least two supporting bars 900 are respectively disposed between the accommodating channels 711f of the side covers 711 of the lamp 700 as well as between the accommodating channels 711f of the side covers 711 of the lamp 800. More specifically, one portion of each of the supporting bars 900 is inserted in the accommodating channel 711f of the side cover 711 of the lamp 700, and the other portion of each of the supporting bars 900 is inserted in the accommodating channel 711f of the side cover 711 of the lamp 800, thereby increasing an engagement stability between the lamp 700 and the lamp 800. In some examples, plural fixing members f1 can be inserted into the side covers 711 to fix the supporting bars 900. Thereafter, as shown in FIG. 15B, the couple mechanism of one end cap (i.e. the first connector 741) of the lamp 800 is coupled to another couple mechanism of the end cap (i.e. the second connector 742) of the lamp 700, thereby connecting the lamp 700 and the lamp 800 together to form the lamp system 600 as shown in FIG. 10.

Since the present invention uses an AC power source as a power supply, only one single wire of the external AC power source P1 extending from the ceiling is used to connect the endmost one of the lamps in the lamp system regardless of the number of the lamps, and no external wires are needed for the rest of the lamps for connecting to the external AC source, thereby simplifying the structure of the lamp system, as shown in FIG. 10.

In addition, in other embodiments, a steel suspension cable having a conductive strand and a plurality of strength strands wound around the conductive strand can be used to replace the wire of the external AC power extending from the ceiling for transmitting external alternating current to the lamps, thereby simplifying the overall design of the lamp system.

It is noted that, as shown in FIG. 16 and FIG. 17, the first integrating member 713 and the second integrating member 714 are located on an upper side of the side covers 711, and the light guide plate 720 is located on a lower side of the side covers 711. When the first decorative cover 715 and the second decorative cover 716 are removed, two opposite side surfaces extending along the second direction D4 of the light guide plate 720 are respectively align with the side surface of the first integrating member 713 and the side surface of the second integrating member 714. Therefore, when the lamp 700 and the lamp 800 are connected together, the light guide plate 720 of the lamp 700 and the light guide plate 720 of the lamp 800 can directly contact each other. More specifically, the second light-emitting surface 723 of the light guide plate 720 of the lamp 700 and the second light-emitting surface 723 of the light guide plate 720 of the lamp 800 are formed in a continuous surface, thus having better appearance and less or no dark areas.

Figure 18:
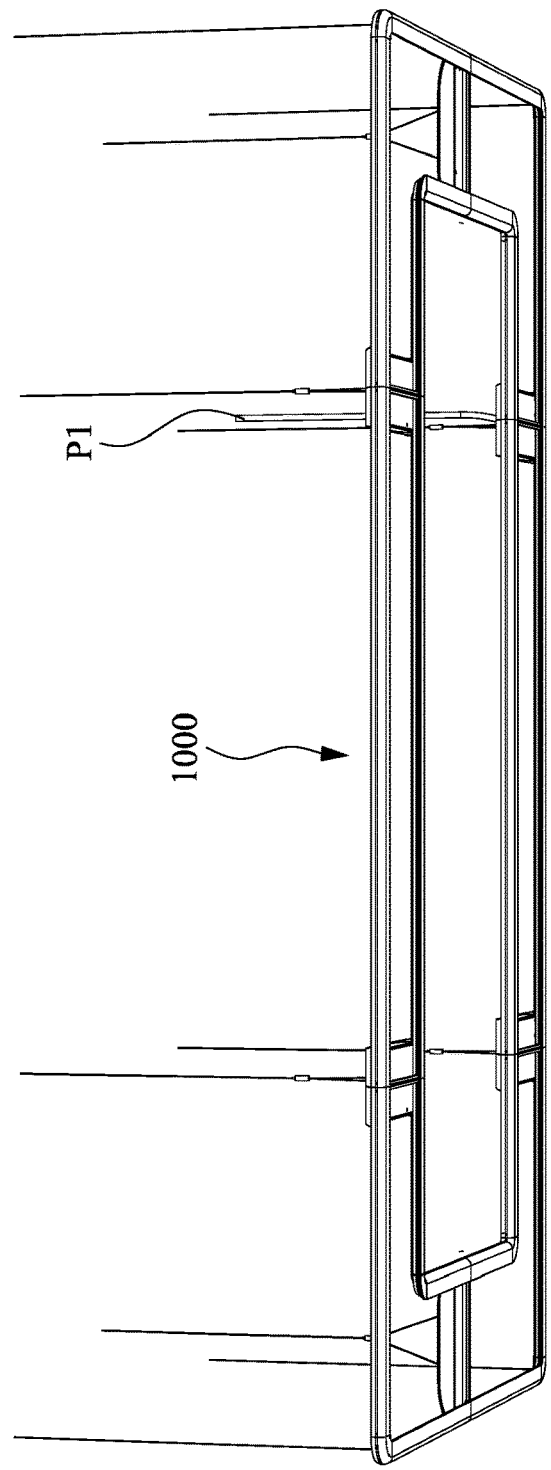
FIG. 18 is a schematic structural diagram showing another lamp system in accordance with an embodiment of the present invention.

In some embodiments, the shape of the lamp is not limited to a rectangle. Referring to FIG. 18, FIG. 18 is a schematic structural diagram showing another lamp system 1000 in accordance with an embodiment of the present invention. In the present embodiment, the lamp system 1000 is formed from connecting two rectangular lamps and four L-shaped lamps together, and the light-emitting surfaces of the rectangular lamps and the L-shaped lamps are connected to form a continuous surface.

According to the aforementioned embodiments of the present invention, the present invention uses the frame body to integrate the circuit assembly, the light source and the light guide plate together, thereby forming a lamp with a simple structure and a quick assembly function. In addition, the frame body of the present invention does not cover the main light-emitting surface of the light guide plate. Therefore, when plural lamps are connected in series to form a lamp system, the light guide plates of the lamps can be jointed to form a continuous structure, thereby improving the appearance of the lamp system.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lamp, comprising:
a frame body, comprising:
two side covers disposed opposite to each other, wherein each of the side covers comprises a carrying portion, a first end and a second end opposite to the first end;
two side bars respectively disposed on the side covers, wherein each of the two side covers is partitioned into an upper space and a lower space by the side bar;
a first integrating member disposed on the first ends of the side covers and located in the upper spaces of the side covers; and
a second integrating member disposed on the second ends of the side covers and located in the upper spaces of the side covers;
a light guide plate held on the carrying portions of the side covers and partially located in the lower spaces of the side covers, wherein the light guide plate has at least one side surface, a first light-emitting surface and a second light-emitting surface, and the first light-emitting surface and the second light-emitting surface are respectively connected to two opposite edges of the side surface, and only side edge portions of the first light-emitting surface and the second light-emitting surface are covered by the frame body;
at least one light source disposed on the carrying portion of the side cover and disposed adjacent to the side surface of the light guide plate; and
a circuit assembly disposed on the frame body and is connected to the light source to form an electrical loop.

2. The lamp of claim 1, wherein each of the side covers further comprises a sidewall and a partition plate, and the sidewall is connected to a side edge of the carrying portion, and the partition plate is disposed on the carrying portion, and an accommodating channel is formed between the sidewall and the partition plate, and the light source is disposed on the partition plate.

3. The lamp of claim 2, wherein the frame body further comprises a first decorative cover covering a side surface of the first integrating member and the accommodating channels, wherein the first decorative cover has at least one first engaging portion engaged in the at least one of the accommodating channels.

4. The lamp of claim 2, wherein the frame body further comprises a second decorative cover covering a side surface of the second integrating member and the accommodating channels, wherein the second decorative cover has at least one second engaging portion engaged in the at least one of the accommodating channels.

5. The lamp of claim 1, wherein
the first integrating member has a first installation space disposed thereon, and the second integrating member has a second installation space disposed thereon;
the circuit assembly comprises:
a first connector disposed in the first installation space;
a second connector disposed in the second installation space; and
a bundle of wires electrically connected to the first connector and the second connector.

6. The lamp of claim 5, wherein each of the side covers further comprises a sidewall and a partition plate, and the sidewall is connected to a side edge of the carrying portion, and the partition plate is disposed on the carrying portion and there is an accommodating channel formed between the partition plate and the sidewall, the light source is disposed on the partition plate, and the wires are disposed in the accommodating channel of at least one of the side covers.

7. The lamp of claim 5, wherein the circuit assembly further comprises a driver electrically connected to the light source, and the driver is disposed in the first installation space or the second installation space.

8. The lamp of claim 5, wherein
at least one of the side bars has a first through hole and a second through hole respectively communicated with the first installation space and the second installation space; and
one end of the bundle of wire extends into the first through hole and is connected to the first connector, and the other end of the bundle of wire extends into the second through hole and is connected to the second connector.

9. The lamp of claim 1, each of the side bars has a folding portion, and the lower space is a space formed between the folding portions and the carrying portions, and the light guide plate is disposed between the folding portions and carrying portions.

10. The lamp of claim 1, wherein the frame body further comprises a first upper cover and a second upper cover, and the first upper cover simultaneously covers the first integrating member and the first ends of the side covers, and the second upper cover simultaneously covers the second integrating member and the second ends of the side covers.

11. The lamp of claim 1, wherein each of the carrying portions has at least one groove, and the light source is engaged in the groove.

12. A lamp system, comprising:
a plurality of lamps of claim 5; and
a plurality of supporting bars each of which is disposed between the side covers of every two adjacent ones of the lamps;
wherein the light guide plates of the lamps are continuously connected to each other;
wherein the circuit assembly of each of the lamps further comprises a driver which is electrically connected to the light source;
wherein the first connector of the circuit assembly of an endmost one of the lamps is configured to be connected to an external AC source;
wherein the first connector of the circuit assembly of each of the rest of the lamps is connected to the second connector of its adjacent lamp so as to form a connection with the endmost one of the lamps.

13. The lamp system of claim 12, further comprises a plurality of fixing members, each of the fixing members is inserted through at least one through hole of each of the side covers and to be fixed on the supporting bars.

14. A method for assembling a lamp system, comprising:
providing a plurality of lamps of claim 1, wherein each of the side covers has an accommodating channel, and the circuit assembly of each of the lamps comprises:
a first connector disposed in the first integrating member;
a second connector disposed in the second integrating member; and
a bundle of wires electrically connected to the first connector and the second connector;
disposing at least two supporting bars between the accommodating channels of the side covers of two adjacent lamps; and
connecting the first connector of one of the lamps to the second connector of another lamp adjacent to the one of the lamps to connect the lamps together.

15. The method of claim 14, wherein
the frame body of each of the lamps further comprises a first decorative cover and a second decorative cover, wherein the first decorative cover covers the side surface of the first integrating member and the accommodating channels, and the second decorative cover covers the side surface of the second integrating member and the accommodating channels;
before the step of disposing the supporting bars between the accommodating channels of the side covers of two adjacent lamps, the method further comprises removing the first decorative covers and the second decorative covers from the lamps.

16. The method of claim 14, wherein after the step of connecting the lamps together, the method further comprises inserting a plurality of fixing members through the side covers so as to fix the supporting bars.

17. A lamp, comprising:
a frame body having an accommodating channel, wherein the frame body comprises a plurality of side covers;
a light guide plate disposed in the accommodating channel, wherein the light guide plate has at least one side surface, a first light-emitting surface and a second light-emitting surface, and the first light-emitting surface and the second light-emitting surface are respectively connected to two opposite edges of the side surface; and
at least one light source disposed in the at least one of the side covers;
wherein only side edge portions of the first light-emitting surface and the second light-emitting surface are covered by the frame body;
wherein the first light-emitting surface and the second light-emitting surface are respectively faced upwardly and downwardly; and
wherein no component blocks the light emitted from the first light-emitting surface faced upwardly.

18. A lamp system, comprising a plurality of lamps, wherein each of the lamps comprises:
a frame body having an accommodating space, wherein the frame body comprises a plurality of side covers and a plurality of end caps, and each of the end caps has a couple mechanism;
a light guide plate disposed in the accommodating space, wherein the light guide plate has at least one side surface, a first light-emitting surface and a second light-emitting surface, and the first light-emitting surface and the second light-emitting surface are respectively connected to two opposite edges of the side surface; and
at least one light source disposed in the at least one of the side covers;
wherein only side edge portions of the first light-emitting surface and the second light-emitting surface are covered by the frame body;
wherein the first light-emitting surface and the second light-emitting surface are faced upwardly and downwardly;
wherein no component blocks the light emitted from the first light-emitting surface faced upwardly; and
wherein the couple mechanism of one end cap of the frame body is coupled to another couple mechanism of the end cap of the frame body of another lamp.

* * * * *